United States Patent
Gunda et al.

(10) Patent No.: US 11,431,573 B1
(45) Date of Patent: *Aug. 30, 2022

(54) MANAGEMENT OF COMPUTING DEVICES VIA REFERENCE TO LINKED EMPLOYEE RECORDS

(71) Applicant: People Center, Inc., San Francisco, CA (US)

(72) Inventors: Siddhartha Gunda, Milpitas, CA (US); Kyle Michael Boston, San Carlos, CA (US); Daniel Robert Buscaglia, San Francisco, CA (US); Dilanka Theshan Dharmasena, Silver Spring, MD (US)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,173

(22) Filed: Nov. 11, 2021

Related U.S. Application Data

(63) Continuation of application No. 17/245,844, filed on Apr. 30, 2021, now Pat. No. 11,184,239.

(51) Int. Cl.
  *G06F 15/173* (2006.01)
  *H04L 41/0893* (2022.01)
  *G06Q 10/10* (2012.01)

(52) U.S. Cl.
  CPC ....... *H04L 41/0893* (2013.01); *G06Q 10/105* (2013.01)

(58) Field of Classification Search
  None
  See application file for complete search history.

(56) References Cited

U.S. PATENT DOCUMENTS

| | | | |
|---|---|---|---|
| 8,910,241 B2 | 12/2014 | Pollutro et al. | |
| 9,749,311 B2 | 8/2017 | Jayanti Venkata et al. | |
| 10,097,973 B2 | 10/2018 | Gross et al. | |
| 10,965,547 B1 | 3/2021 | Esposito et al. | |
| 2003/0212705 A1* | 11/2003 | Williamson | G06F 16/2438 |

(Continued)

OTHER PUBLICATIONS

International Search Report and Written Opinion for Application No. PCT/US2022/026987, dated Jul. 11, 2022, 19 pages.

*Primary Examiner* — Quang N Nguyen
(74) *Attorney, Agent, or Firm* — Dority & Manning, P.A.

(57) ABSTRACT

Methods, systems, devices, and tangible non-transitory computer readable media for checking computing device inactivity are provided. The disclosed technology can access, based on a device policy, organizational data associated with activity of a user's computing device. Based on the device policy and the organizational data, a valid inactivity time period including continuous organization approved time periods of valid inactivity beginning at a most recent time the computing device was active and ending a predetermined amount of time after the most recent time can be determined. Based on the device policy and the organizational data, a determination of whether inactivity criteria associated with inactivity of the computing device are satisfied is made. Satisfying the inactivity criteria can include the computing device being inactive after the valid inactivity time period. Furthermore, indications associated with the computing device's inactivity can be generated if the inactivity criteria are satisfied.

19 Claims, 14 Drawing Sheets

(56) References Cited

U.S. PATENT DOCUMENTS

| | | | |
|---|---|---|---|
| 2004/0230914 A1* | 11/2004 | Arend | G06F 3/0482 |
| | | | 715/804 |
| 2005/0065977 A1* | 3/2005 | Benson | H04L 29/12169 |
| 2008/0040135 A1* | 2/2008 | Van | G06Q 10/105 |
| | | | 705/342 |
| 2010/0332635 A1 | 12/2010 | Rogel et al. | |
| 2011/0176683 A1 | 7/2011 | Iwaki et al. | |
| 2012/0036220 A1 | 2/2012 | Dare et al. | |
| 2012/0036245 A1 | 2/2012 | Dare et al. | |
| 2015/0163121 A1 | 6/2015 | Mahaffey et al. | |
| 2015/0371034 A1 | 12/2015 | Miller et al. | |
| 2016/0088021 A1 | 3/2016 | Jayanti Venkata et al. | |
| 2016/0224780 A1 | 8/2016 | Kukreja et al. | |
| 2017/0235466 A1* | 8/2017 | Tanwir | G06F 3/0481 |
| | | | 715/738 |

* cited by examiner

US 11,431,573 B1

MANAGEMENT OF COMPUTING DEVICES VIA REFERENCE TO LINKED EMPLOYEE RECORDS

PRIORITY CLAIM

The present application is a continuation of U.S. application Ser. No. 17/245,844 having a filing date of Apr. 30, 2021. Applicant claims priority to and the benefit of each of such applications and incorporate all such applications herein by reference in its entirety.

FIELD

The present disclosure generally relates to managing computing devices based on associated organization data such as employee records or other employee-related information. More particularly, the present disclosure relates to using organizational data such as linked employee records and associated employee information when configuring or re-configuring computing devices (e.g., as part of a device provisioning process) and/or checking the status and activity computing devices.

BACKGROUND

Computing systems can be used as part of a platform on which various devices including computing devices associated with members of an organization are managed. Management of the computing devices can become more complex as new devices are added, existing devices are serviced or repaired, older devices are taken out of service, and existing devices are used by different members of the organization.

Further, management of the various devices of an organization can assume different forms, including manual management of devices by a device administrator or even the user of the device. Such management can involve the administrator or user manually checking the status and activity of associated devices. Manually checking the status and activity of devices can be time-consuming and burdensome to the individuals tasked with performing the checks. Additionally, on an organizational level, simply keeping track of an organization's devices can consume time and resources that might otherwise be used for other activities.

As such, improving the effectiveness and ease with which the status and activity of the computing devices of an organization's users are checked may result in an improvement in the overall effectiveness of operations across the organization. Likewise, improving the automated configurability of devices would be beneficial. Accordingly, there exists a demand for a more effective way of managing computing devices associated with an organization.

SUMMARY

Aspects and advantages of embodiments of the present disclosure will be set forth in part in the following description, or can be learned from the description, or can be learned through practice of the embodiments.

One example aspect of the present disclosure is directed to a computing system for improved device management via reference to employee data. The computing system includes one or more processors and one or more databases that store a centralized set of organizational data associated with an organization. The organizational data comprises a plurality of device objects respectively associated with a plurality of computing devices and a plurality of employee objects respectively associated with a plurality of employees of the organization. A first device object of the plurality of device objects is associated with a first employee object of the plurality of employee objects. The computing system includes one or more non-transitory computer-readable media that collectively store instructions that, when executed by the one or more processors, cause the computing system to perform actions. The actions include receiving device data associated with a first computing device associated with the first device object. The actions include obtaining a device policy associated with the first computing device. The actions include accessing, from the centralized set of organizational data, an employee record associated with the first employee object with which the first device object is associated in the centralized set of organizational data. The actions include evaluating the device policy based at least in part on the employee record to determine one or more operations. The actions include performing the one or more operations determined from evaluating the device policy.

Another example aspect of the present disclosure is directed to a computer-implemented method of checking computing device inactivity. The computer-implemented method can include accessing, by a computing system comprising one or more processors, based at least in part on a device policy, organizational data that can include information associated with activity of a computing device of a user. The device policy can include inactivity criteria associated with inactivity of the computing device. The computer-implemented method can include determining, by the computing system, based at least in part on the device policy and the organizational data, a valid inactivity time period including one or more organization approved time periods of valid inactivity that are continuous and comprise a time period beginning at a most recent time the computing device was active and ending a predetermined amount of time after the most recent time the computing device was active. The computer-implemented method can include determining, by the computing system, based at least in part on the device policy and the organizational data, whether the inactivity criteria are satisfied. Satisfying the inactivity criteria can include the computing device being inactive after the valid inactivity time period. Furthermore, the computer-implemented method can include performing, by the computing system, based at least in part on the device policy, one or more operations if the inactivity criteria are satisfied. The one or more operations can include generating one or more indications associated with the inactivity of the computing device.

Another example aspect of the present disclosure is directed to one or more tangible non-transitory computer-readable media storing computer-readable instructions that when executed by one or more processors cause the one or more processors to perform operations. The operations can include accessing, by a computing system comprising one or more processors, based at least in part on a device policy, organizational data that can include information associated with activity of a computing device of a user. The device policy can include inactivity criteria associated with inactivity of the computing device. The operations can include determining, by the computing system, based at least in part on the device policy and the organizational data, a valid inactivity time period comprising one or more organization approved time periods of valid inactivity that are continuous and comprise a time period beginning at a most recent time the computing device was active and ending a predetermined amount of time after the most recent time the computing device was active. The operations can include determining, by the computing system, based at least in part on the device policy and the organizational data, whether the inactivity criteria are satisfied. Satisfying the inactivity criteria can include the computing device being inactive after the valid inactivity time period. Furthermore, the operations can include performing, by the computing system, based at least in part on the device policy, one or more operations if the inactivity criteria are satisfied. The one or more operations can include generating one or more indications associated with the inactivity of the computing device.

Another example aspect of the present disclosure is directed to a computing system that includes: one or more processors; one or more non-transitory computer-readable media storing instructions that when executed by the one or more processors cause the one or more processors to perform operations. The operations can include accessing, based at least in part on a device policy, organizational data that can include information associated with activity of a computing device of a user. The device policy can include inactivity criteria associated with inactivity of the computing device. The operations can include determining, based at least in part on the device policy and the organizational data, a valid inactivity time period comprising one or more organization approved time periods of valid inactivity that are continuous and comprise a time period beginning at a most recent time the computing device was active and ending a predetermined amount of time after the most recent time the computing device was active. The operations can include determining, based at least in part on the device policy and the organizational data, whether the inactivity criteria are satisfied. Satisfying the inactivity criteria can include the computing device being inactive after the valid inactivity time period. Furthermore, the operations can include performing, based at least in part on the device policy, one or more operations if the inactivity criteria are satisfied. The one or more operations can include generating one or more indications associated with the inactivity of the computing device.

Other aspects of the present disclosure are directed to various systems, apparatuses, non-transitory computer-readable media, user interfaces, and devices for checking the status and activity of computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
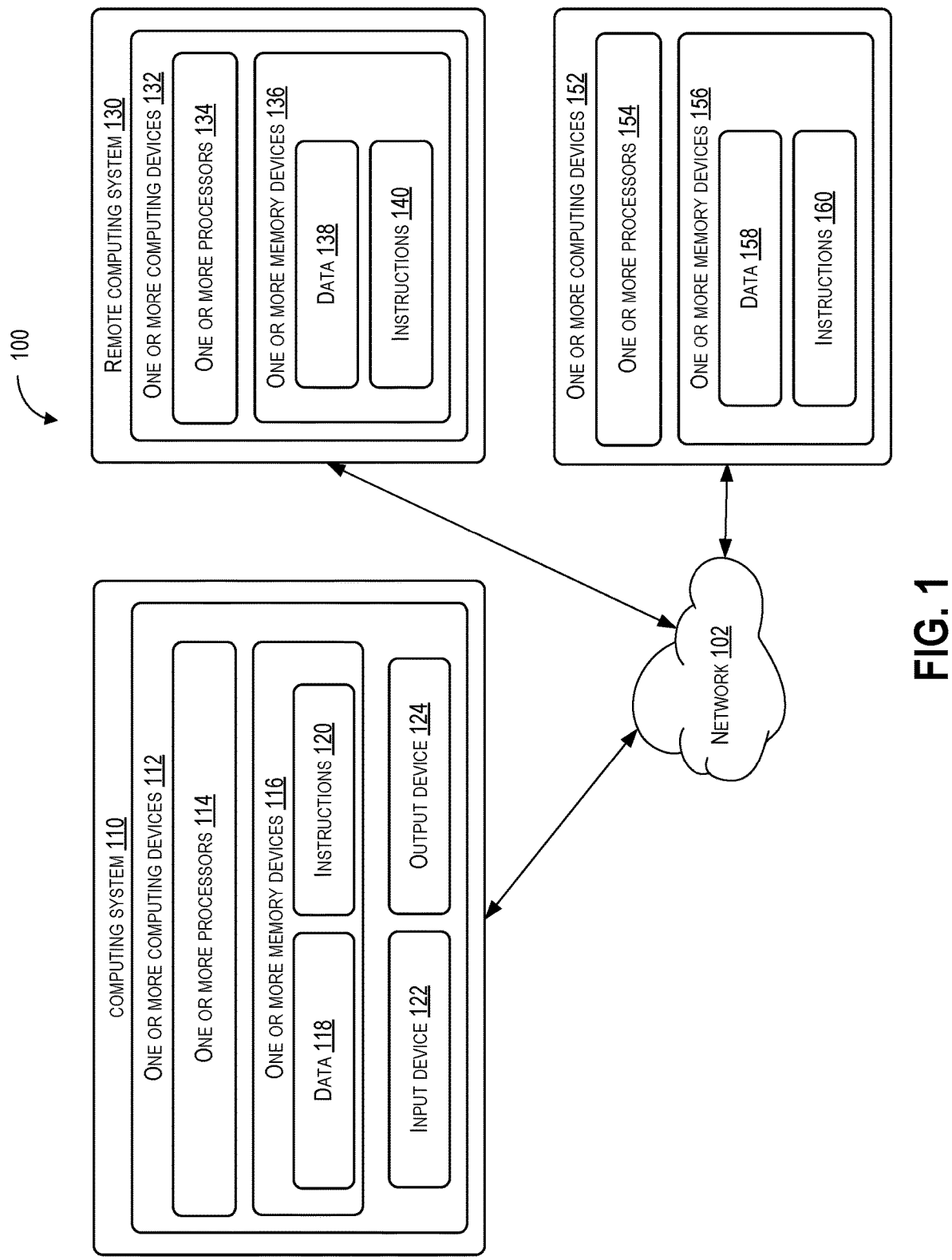
FIG. 1 depicts a block diagram of an example environment including a computing system that performs operations according to example embodiments of the present disclosure.

Reference numerals that are repeated across plural figures are intended to identify the same features in various implementations.

DETAILED DESCRIPTION

The present disclosure is generally directed managing computing devices based on associated organization data such as employee records or other employee-related information, including using organizational data such as linked employee records and associated employee information when configuring or re-configuring computing devices (e.g., as part of a device provisioning process) and/or checking the status and activity computing devices. In particular, example aspects of the present disclosure are directed to a computing system that can be used to check the status and activity of computing devices to determine whether the computing devices were inactive for longer than a threshold period of time. Other example aspects are directed to the automatic configuration or re-configuration of computing devices based on changes or modifications made to an employee record associated with an employee to whom the device is assigned. The computing systems described herein can provide specific benefits including improving the security of computing devices, improving the efficiency of managing large numbers of computing devices, and notifying users and other organizational personnel when a computing device has been inactive for longer than a time period mandated by an organization's device policy.

In particular, example systems and methods described herein can maintain and leverage organizational data for an organization that includes both employee objects which represent employees of the organization (or other persons somehow associated with the organization) and device objects which represent computing devices associated with the organization. The computing devices can be any form of computing devices such as, for example, laptops, mobile devices, user devices, deployed operational equipment (e.g., manufacturing devices, sensing devices, autonomous robotics devices), and/or other forms of computing devices. According to an aspect of the present disclosure, one or more logical associations can be created, maintained, updated, etc. in the organizational data to join or otherwise associate a device with an employee (or vice versa). Once generated, this relationship can be used for various operations or workflows, including action triggering, policy evaluation, report generation/reporting capabilities, etc. In particular, once an association has been made between a device and an employee, any information also associated with that employee can be used to provide richer, context-aware functionality. For example, various different information technology and/or device provisioning operations can be made aware of or operate as a function of or with reference to the employee record or other organizational data linked to the employee.

As such, according to one aspect, the disclosed technology can periodically or continuously determine the status or activity of computing devices. For example, the disclosed technology can identify computing devices that have been inactive for too long, which may in some cases be associated with the loss of the computing device. Further, identifying computing devices that have been inactive for longer than a threshold period of time can improve organizational efficiency by quickly identifying the inactive devices and curtailing the losses that result from decreased usage of computing resources that could otherwise be assigned to other users in an organization. Additionally, the disclosed technology can provide a user (e.g., an administrator) with a convenient and time saving way to notify other users and their managers when a computing device has been inactive for too long.

According to another aspect, the disclosed technology can automatically configure or reconfigure a computing device based on changes or modifications made to an employee record associated with an employee to whom the device is assigned. The automated configuration can be performed at the time of device provisioning and/or periodically thereafter. Configuration of devices can include the (e.g., remote) installation or uninstallation of software, configuration of access controls (e.g., account and/or password settings), device operating parameters, enrollment of unenrollment in various groups or device sets, device activation or deactivation, assigning storage amounts, control of device settings or other information technology settings or controls, and/or other device configuration operations.

More particularly, example aspects of the present disclosure are directed to an organizational management platform that controls and leverages organizational data to enable the automatic creation and implementation of different device policies that can be customized for different users or groups of users (e.g., groups of employees) included in a set of users (e.g., every employees in an organization). In particular, an organizational management platform can control and leverage organizational data to manage organizational devices including computing devices that are assigned to the organization's users. For example, the organizational management platform can be used to control the provisioning and deprovisioning of smartphones, laptop computing devices, and/or other computing devices that are used by or otherwise associated with employees or other users of an organization.

The organizational management platform can hold, for each of one or more organizations, a centralized set of organizational data that acts as a single, centralized system of record for organizational management processes for that organization. Each organization can include a number of users who are able to access and interact with the organizational management platform. Some users may have administrative permissions that define whether the user is able to access and/or modify certain types of organizational data for their organization.

The organizational data for each organization can include data directly entered into the organizational management platform. Further, the organizational data can include data retrieved, pulled, or otherwise obtained from one or more organizational applications and/or extra-organizational applications (e.g., third-party applications) that are associated with one or more computing devices and with which the organizational management platform may have varying levels of integration. The one or more computing devices can include computing devices that are under the control of the organization and/or computing devices that are under the control of an entity that operates outside the control of the organization. This ingestion and storage of data from non-organizational computing devices and third-party applications is in contrast to systems that simply sit on top of third-party applications and apply some criteria at run time. In some implementations, the organizational management platform can provide a user with the ability to configure the cadence or periodicity with which the organizational management platform receives or ingests data from non-organizational computing devices. Data can be transferred between the organizational management platform and third-party applications (e.g., to and/or from) using various techniques such as application programming interfaces, data hooks, flat files, bulk uploads/downloads and/or other data transfer mechanisms.

The organizational data can, in some implementations, be stored or maintained as one or more object databases. For example, multiple object classes can be defined in the object databases. Example object classes include employees, devices, job candidates, benefits policies, documents, pay instances, time cards, and/or other objects. For each object, values can be provided and maintained for one or more attributes, including location, organizational department, role, and/or salary. Links can be made between different objects. For example, one or more device objects can be associated with employee objects.

The one or more object database can be represented by or stored as data that can be represented as one or more graphs with nodes that correspond to objects and edges that correspond to links or logical associations between objects and/or object attribute(s). Graph(s) can be traversed to determine or leverage relationships among objects and their attribute(s). In one example, the organizational data can be synthesized into a single graph which includes multiple classes of objects and defines complex relationships among objects and their attribute(s). For example, workflows, including payroll, information technology (IT), and/or marketing can be run through one platform and graph.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of computing devices (e.g. the "work laptops" group of the devices) or applications.

According to one example aspect, an administrator or other user of the organizational management platform can be permitted to define a device policy that is a function of, defined according to, or which when evaluated makes reference to the organizational data. When used to define or implement device policies, the organizational management platform may be referred to as a device policy computing system.

Thus, different device policies can be defined for different users or groups of users on the basis of the organizational data. When a user seeks to access, control, and/or modify one or more devices, applications, and/or datasets, the appropriate device policy can be accessed and implemented based on the organizational data associated with the user.

As one simplified example, an employee group "IT administrators" that is defined within the organizational data can have a device policy (e.g., a policy that determines when a user's computing devices have active and performs some action when the computing device has been inactive for too long). In this way a user can configure and implement a device policy that can use organizational data associated with various applications to perform operations using a different set of applications.

According to another example aspect, in some implementations, some portion of the customized device policies can be defined using one or more expressions written in a query language. The expressions in the query language may include one or more queries that query against the organizational data to return a result. For example, the query language can be a domain-specific query language that can be used to perform (e.g., in real time) queries against the organizational data. The query language can be used to define functions or queries that return data that satisfies or responds to the functions or queries. In some implementations, the query language is a declarative language. In some implementations, the query language includes organizational functions or operators that leverage organizational relationships within the organizational data. For example, the organization function ORG (employee,relationship) returns one or more other employees that have the specified relationship to the specified employee.

As described above, an administrator or other user of the system can generate and cause the implementation of customized device policies that are expressed using one or more query expressions that query against a set of organizational data. This enables the linking of organizational data (e.g., human resources data or other employee data) to device management, application access/control, and/or other forms of access rights management. As such, a single, core source of organizational data can flow through to custom device policies. The device policies can define rules about device provisioning, device configuration, software installations on the computing devices, and/or other settings, including push settings and/or pull settings.

The disclosed technology can be used to generate and/or configure a device policy that automatically configures or reconfigures computing devices. The device policy can use data (e.g., organizational data such as employee-related data) to trigger and/or execute the automatic configuration of a device. Thus, in some implementations, a change to an employee record can trigger or otherwise result in an automatic reconfiguration of a computing device. For example, assume that a device policy associated with a certain computing device indicates that (e.g., for the purpose of complying with various software licenses) a first suite of computer software should be used by employees located in a first country while a second suite of computer software should be used by employees located in a second country. Further assume that an employee currently working in the first country decides to relocate to the second country. When this move is approved and effectuated by human resources, the employee's record can be updated to indicate that the employee is now working in the second country. When the device policy for the employee's device is next evaluated (e.g., which may be triggered by the change to the employee record), the evaluation of the policy may include checking the employee's record to determine that the employee's device should have the second suite of computer software installed thereon. Therefore, automatic operations can be triggered which uninstall the first suite of software and then install the second suite of software. Previously, such operations would have required separate notification of an information technology department. However, by the use of device policies which include reference to employee data, changes to the employee data can automatically result in or flow to corresponding information technology or other device management operations.

The disclosed technology can also be used to generate and/or configure a device policy that checks the status and/or activities of devices. The device policy can use data (e.g., organizational data such as employee-related data) to determine the status and activities of one or more devices.

For example, when an employee is on vacation, the employee may stop using their work-provided computing device (e.g., smartphone) for the duration of their vacation. If the organizational data did not indicate that the employee was on vacation or some other organization approved activity, the employee not accessing or otherwise using their computing device could trigger an alert that is sent to the user's manager and that includes an indication that the user's computing device may be lost or out of service. Using the disclosed technology, implementation of the device policy may include accessing organizational data that indicates the employee was on vacation for the time period during which the device was not accessed. The disclosed technology can then forestall generating the alert until inactivity criteria associated with the computing device's inactivity (e.g., the user's computing device remaining inactive until after the user's vacation) are satisfied.

In some examples, when an employee travels with a computing device, the employee may enter a geographic area from which the employee's organization assigned computing device does not operate and as a result is assigned a different device for the duration of the employee's travel to the geographic area. To prevent the user's originally assigned computing device from being deemed inactive due to the employees sojourn to the different geographic area, the disclosed technology can access the organizational data and determine that the user was not inside the geographic area and extend the time period of valid inactivity for the originally assigned computing device.

By way of further example, when an employee has been assigned a new computing device to replace an older computing device the user may stop using the older computing device. As a result of the employee not using the older computing device, the older computing device will not check-in (e.g., verify that the computing device is active) to computing systems of the employee's organization. The disclosed technology can analyze the organizational data of the employee's organization to determine that the employee is no longer assigned to the computing device and may mark the computing device as available for reassignment to another employee. In this way, the organization can achieve a higher utilization of its computing resources.

In some implementations, the computing system can include a graphical user interface that offers users a quick and easy way to configure and implement device policies without the burden of learning complex rules and syntax. For example, a user can create a device policy for a user or group of users by choosing from options including user names, device identifiers, and valid inactivity time periods that are displayed on a graphical user interface. In this way, the potentially complicated process of using specialized expressions and queries can be avoided or significantly reduced. Using the disclosed technology, the user can create device policies via a front-end that facilitates creation of comprehensive device policies without sacrificing specificity or coverage of users.

By way of example, a computing system implementing the disclosed technology can access organizational data based on a device policy. The organizational data can include indications of the times that a computing device (e.g., a smartphone) of a user was active (e.g., accessed by the user). For example, the organizational data can include times (e.g., dates and times of day) when a smartphone connected to a network and accessed applications stored on an organization's computing server. The computing system can then use the organizational data to determine a valid inactivity time period. The valid inactivity time period can include organization approved time periods of inactivity (e.g., user vacation, organization holidays, user medical leave). Further, the valid inactivity time period can include an amount of time between the most recent time the computing device was accessed and a subsequent time (e.g., the current time) that is after the most recent time the computing device was accessed. The computing system can apply the device policy to the organizational data to determine whether inactivity criteria associated with the computing device being inactive are satisfied. For example, the disclosed technology can determine that the inactivity criteria are satisfied if the computing device was inactive for a threshold amount of time and other computing devices (e.g., alternative computing devices that can be used by the user in place of the smartphone assigned to the user) were not assigned to the user. Furthermore, if the criteria are satisfied, the disclosed technology can perform operations including sending notifications to a manager of the user in order to inform the manager that the user's computing device has been inactive for too long.

Accordingly, the disclosed technology may improve the effectiveness with which the status and activities of computing devices are checked. In particular, the disclosed technology can use a device policy to generate and send appropriate notifications when computing devices have been inactive for too long. Further, the disclosed technology can alleviate the burden of manual device status and activity checks by providing an automated system that checks not only the amount of time a device has been inactive but also uses organizational data to determine whether the device inactivity is valid (e.g., approved by the organization).

The computing system can access, receive, obtain, and/or retrieve data which can include organizational data and/or data associated with a device policy. Accessing the organizational data can be based at least in part on the device policy which can be associated with managing, tracking, and/or monitoring the activity and/or inactivity of one or more computing devices and/or one or more computing systems.

The organizational data can include information associated with one or more computing devices and/or one or more computing systems. Further, the organizational data can include information associated with one or more times a computing device of a user was active. For example, the organizational data can include information associated with whether a computing device is on, off, or on standby (e.g., sleep mode); one or more times including the time when a computing device was most recently accessed by a user or was used to access a communications network; and/or when a computing device most recently checked-in to a computing system of an organization.

Further, the organizational data can include a device identifier associated with a computing device, a user identifier associated with the name of a user of the computing device, and/or one or more times (e.g., a date and time of day) that the computing device was used by the user. The computing device can use the device identifier, the user identifier, and the one or more times the computing device was used by the user to generate a device policy that can be used to determine whether the computing device satisfies criteria (e.g., inactivity criteria) associated with the activity and/or inactivity of the computing device.

The organizational data can be associated with an organization and can include information associated with one or more members of the organization and/or one or more user computing devices including the computing device of the user. For example, the one or more records associated with the one or more members (e.g., employees) of the organization can include one or more employee names, one or more positions (e.g., positions and/or roles of the one or more members within an organizational hierarchy), and/or one or more groups (e.g., groups including teams of users that use the same computing devices).

The device policy can include one or more criteria, one or more rules, and/or one or more conditions associated with the status and/or activity (or inactivity) of one or more computing devices. The one or more criteria, one or more rules, and/or one or more conditions can be associated with implementing a device policy by using organizational data associated with one or more computing devices (e.g., a smartphone used by a user of an organization associated with the organizational data) to determine the activity and/or inactivity of the one or more computing devices. In particular, the device policy can include inactivity criteria associated with the activity and/or inactivity of one or more computing devices. For example, the device policy can include inactivity criteria indicating that a computing device should not be inactive for longer than two (2) weeks and that if the computing device is inactive for longer than two (2) weeks a notification should be sent to the user of the computing device. The device policy can also use other information from the organizational data (e.g., the employment status of computing device users, time periods when a computing device is serviced, and/or computing device user assignments).

In some embodiments, the organizational data can include information associated with one or more relationships. The one or more relationships can include relationships between users that have different ranks within an organization. For example, the one or more relationships can be between a user and one or more other users that have the same organizational rank, a lower organizational rank, or a higher organizational rank. Further, the organizational data can include information associated with the position (e.g., relative position and/or absolute position) of one or more employees of an organization. The one or more respective positions of the one or more employees can be used to determine who is allowed to perform various operations including configuring the device policy, generating reports, and receiving communications regarding the inactivity of a computing device. Further, the one or more relationships between a user and other members of an organization can be used to determine who (e.g., which member of an organization) receives notifications regarding the inactivity or activity of a user's computing device.

The computing device being inactive can include the computing device not performing any action and/or operation. Further, the actions and/or operations that are not performed when the computing device is inactive can include accessing the organizational data (e.g., reading a record stored in the organizational data), accessing one or more applications associated with the organizational data (e.g., the computing device logging into a software application), and/or communicating with one or more other computing devices associated with the organizational data (e.g., the computing device checking-in to one or more remote computing devices of an organization associated with the organizational data).

The computing system can determine a valid inactivity time period. Determination of the valid inactivity time period can be based at least in part on the device policy and/or the organizational data. The valid inactivity time period can include any combination of one or more organization approved time periods of valid inactivity (e.g., the computing device is not being used by the user) that are continuous. For example, the valid inactivity time period can include any combination of a default organization approved time period of valid inactivity and any other organization approved time period of valid inactivity. The default organization approved time period of valid inactivity can be based at least in part on a predetermined amount of time (e.g., seventy-two (72) hours) that is triggered every time the computing device is detected as being active. The other organization approved time periods can include user vacations that are continuous with the default organization approved time period of valid inactivity and that may end after the default organization approved time period. In some embodiments, the one or more organization approved time periods of valid inactivity are contiguous or overlap.

Further, the one or more organization approved time periods of valid inactivity can include a time period that begins at a most recent time the computing device was active and ends a predetermined amount of time after the most recent time the computing device was active. For example, if the most recent time a computing device was active is Tuesday at five (5) o'clock p.m. and the predetermined amount of time is one week (one-hundred and sixty eight hours), the one or more organization approved time periods of valid inactivity will end no earlier than at five (5) o'clock p.m. on Tuesday of the following week. Further, the valid inactivity time period can be dynamically updated such that each time the computing device is active, the end of the valid inactivity time period is updated to start when the computing device was most recently active. For example, if a valid inactivity time period started at noon on a Monday and has a duration of three (3) days that will end on Thursday of the same week at noon, the valid inactivity time period will be updated to noon on Friday of the same week if the most recent time the computing device is active is at noon on Tuesday of the same week.

The computing system can determine whether the inactivity criteria are satisfied. Determination of whether the inactivity criteria are satisfied can be based at least in part on the device policy and/or the organizational data. Satisfying the inactivity criteria can include the computing device being inactive after the valid inactivity time period (e.g., any time after the end of the valid inactivity time period). The determination of whether the inactivity criteria are satisfied can be based at least in part on using the device policy to analyze the organizational data. For example, first the computing system can use the organizational data to determine whether the computing device was inactive at any time after an organization approved time period of valid inactivity that is triggered by activity of the computing device and ends after some predetermined amount of time. Next, the computing device can use the organizational data to determine whether any other organization approved time periods of valid inactivity that are continuous with the default organization approved time periods of valid inactivity and end after the default organization approved time periods of valid inactivity.

Satisfying the inactivity criteria can include the valid inactivity time period ending before a current time. For example, the computing system can determine a current time (e.g., the computing system can include an internal clock and/or access the current time that is provided by a remote computing device). Further, the computing system can access the organizational data to determine when the computing device was mostly active and use the device policy to determine the valid inactivity time period. The computing system can then determine whether the inactivity criteria have been satisfied based at least in part on one or more comparisons of the current time to the end of the valid inactivity time period. For example, if the valid inactivity time period ended at one (1) o'clock on a Wednesday and the computing device has not been active since the valid inactivity time period ended, then the computing device still being inactive when the current time is one (1) o'clock on Friday of the same week will satisfy the inactivity criteria.

In some embodiments, the organizational data can include information associated with an employment status of the user. For example, the organizational data can include information indicating whether a user is employed by an organization that provides, controls, and/or owns the computing device. Further, satisfying the inactivity criteria can include the employment status of the user indicating that the user was employed by the organization during the valid inactivity time period. For example, the computing system can access the organizational data to determine the employment status of the user of the computing device during the valid inactivity time period. The computing system can then determine whether the inactivity criteria have been satisfied based at least in part on whether the employment status of the user indicated that the user was employed by the organization for the entirety of the valid inactivity time period. For example, the inactivity criteria will be satisfied if the user was not employed by the organization for the entirety of the valid inactivity time period.

In some embodiments, the organizational data can include information associated with a schedule of the user that indicates the one or more organization approved time periods of valid inactivity. For example, the organizational data can include information indicating any time period when the user is on a scheduled medical leave. Further, satisfying the inactivity criteria can include the computing device being inactive during a time period that does not coincide with the one or more organization approved time periods of valid inactivity that are indicated in the schedule. For example, the computing system can determine that the inactivity criteria are satisfied if the computing device is inactive during a time period that does not coincide with an organization approved time period of valid inactivity that is associated with an organization approved event that is scheduled for a user (e.g., a user's scheduled leave).

In some embodiments, the one or more organization approved time periods of valid inactivity can include one or more time periods during which the organizational data indicates that the user is on vacation, on medical leave, and/or scheduled to be in a geographic area without network connectivity. Further, the organizational data can include information associated with the one or more organization approved time periods of valid inactivity. For example, the organizational data can include calendar and/or schedule information that includes the organization approved time period of valid inactivity indicating that a user is on vacation for one week.

In some embodiments, the organizational data can include information associated with a device assignment of the computing device. For example, the organizational data can include information indicating that a laptop computing device is assigned to the user. Further, satisfying the inactivity criteria can include the device assignment indicating that the computing device was not assigned to the user for the entirety of the valid inactivity time period. For example, the computing system can access the organizational data to determine whether the computing device was assigned to the user during the entirety of the valid inactivity time period. The computing system can then determine that the inactivity criteria have been satisfied if the computing device was not assigned to the user for the entirety of the valid inactivity time period.

In some embodiments, the organizational data can include information associated with whether the computing device was serviced, repaired, and/or updated during one or more device service time periods. Further, the one or more organization approved time periods of valid inactivity can include the one or more device service time periods. For example, the organizational data can include information indicating that a user's computing device was being serviced for a one (1) day period of time period that is continuous with the remainder of the valid inactivity time period. Satisfying the inactivity criteria can include the computing device being inactive during a time period that does not coincide with the one or more organization approved time periods of valid inactivity that include the one or more device service time periods. For example, the computing system can determine that the inactivity criteria are satisfied if the computing device is inactive during a time period that does not coincide with an organization approved time period of valid inactivity during which the computing device is being repaired or is receiving software updates.

In some embodiments, the organizational data can include information associated with one or more alternative computing devices that are used by the user. For example, the user can use an alternative smartphone in addition to another smartphone that was provided by an organization. Satisfying the inactivity criteria can include the one or more alternative computing devices being inactive after the valid inactivity time period.

In some embodiments, the organizational data can include one or more communications (e.g., communications from the user or a manager of the user) associated with whether the user will be validly inactive for an organization approved time period. For example, the organizational data can include one or more copies of e-mail messages sent or received by the user and/or one or more managers or other colleagues of the user. Further, the one or more communications can include an indication that the user will be validly inactive for an organization approved time period. For example, the computing system can analyze the content of the one or more communications to determine whether the one or more communications include organizational codes and/or keywords associated with approval of a time period of valid inactivity (e.g., a vacation approval). Further, the one or more organization approved time periods of valid inactivity can include the approved time period indicated in the one or more communications. Satisfying the inactivity criteria can include the computing devices being inactive during a time period that does not coincide with the one or more organization approved time periods of valid inactivity associated with the one or more communications.

The computing system can perform one or more operations based at least in part on the device policy. Further, the computing system can perform the one or more operations if the inactivity criteria are satisfied. The one or more operations can include generating one or more indications associated with the inactivity of the computing device. For example, upon determining that the inactivity criteria are satisfied, the computing system can send a message indicating "THE USER'S COMPUTING DEVICE HAS BEEN INACTIVE FOR MORE THAN ONE WEEK" to the user's manager.

The one or more operations can include the computing system adding the one or more indications associated with the computing device being inactive to the organizational data. The one or more indications can include a current time (e.g., a current time of day), a device identifier associated with the computing device, and/or a user identifier associated with the user. Further, the computing system can access the organizational data and create a record of the one or more indications in the organizational data. For example, the computing system can add the one or more indications including a time and date, computing device identifier, and user name to the organizational data.

The one or more operations can include the computing system determining, based at least in part on the organizational data, a name of the user associated with the computing device and an amount of time since the computing device was used and/or accessed by the user. For example, the computing system can access the organizational data that includes the name of the user associated with the computing device and can determine the amount of time since the computing device was accessed by the user based at least in part on the most recent time the user accessed (e.g., logged into the computing device) the computing device.

The computing system can perform one or more operations including generating one or more reports that include the name of the user associated with the computing device and/or an amount of time since the computing device was most recently accessed by the user. For example, the computing system can generate a report including the name of the user and the amount of time since the user used a particular device that can be provided to a manager of the user.

The computing system can perform one or more operations including determining, based at least in part on the organizational data, one or more communications channels via which the user or a manager of the user can be contacted. For example, the computing system can access the organizational data that includes information associated with the e-mail address and/or telephone number via which a user of the computing device and/or a manager of the user can be contacted.

Further, the computing system can perform one or more operations including sending one or more notifications that can include the one or more indications to the user and/or the manager. The one or more communications can be sent via the one or more communications channels. The one or more communications channels can include e-mail communication, text messaging, and/or telephone communication. For example, the computing system can send one or more notifications to a manager of the user via text message (e.g., SMS messaging). The one or more notifications can include one or more indications that the computing device associated with the user has been inactive for a time exceeding the valid inactivity time period of a device policy associated with the computing device.

In some embodiments, the organizational data comprises information associated with an organization and can include information associated with one or more members (e.g., employees of a for-profit organization, students of a school system or school organization, and/or volunteers of a charitable organization) of the organization and one or more user computing devices comprising the computing device of the user. For example, the organizational data can include information indicating which members of an organization are employees and which members of an organization are not employees.

In some embodiments, the device policy can include, be associated with, and/or be based at least in part on an application specific query language that is that is configurable to generate one or more expressions associated with configuring the device policy; accessing and/or modifying the organizational data; accessing and/or modifying the device policy; and/or performing one or more operations. For example, the inactivity criteria can be based at least in part on an expression that is created using an application specific query language that may be configured to generate an expression that is associated with instructions to access the organizational data and/or a computing device associated with the organizational data. Further, the application specific query language may also be used as the basis for one or more inputs provided by a user to configure the device policy. For example, a user can enter (via a touchscreen device) expressions defining the frequency with which a computing device will be required to check-in to a remote computing device of an organization in order to verify that the computing device is active and/or to confirm that the computing device is inactive.

In some embodiments, the device policy can include a check-in policy in which the computing device is configured to perform a check-in that includes one or more attempts to access one or more remote computing devices associated with the organizational data. For example, the device policy can indicate that the computing device should check-in to a remote computing device associated with an organization at least once a week. Further, the inactivity criteria can be satisfied if the computing device does not attempt to perform the check-in a predetermined number of times within the valid inactivity time period. For example, the device policy can include criteria including the condition that the computing device should attempt to check-in to an organization's remote computing device at least three times per month.

Based at least in part on the determination that inactivity criteria have been satisfied, the computing system can send a notification to an administrator of the computing device so that the administrator can take some action to determine why the computing device was inactive. By way of further example, in response to determining that the inactivity criteria have been satisfied, the computing system can send a text message to the manager of the user associated with the computing device. The text message can indicate to the manager that the computing device of the user has been inactive beyond the valid inactivity time period and that some action should be taken to determine why the computing device was inactive.

The computing system can access, receive, and/or obtain one or more inputs (e.g., inputs from the user) via a graphical user interface configured to display one or more options to configure a device policy for one or more computing devices which can include the computing device of the user. Further, the device policy and/or the organizational data can include and/or be associated with a device identifier associated with the computing device and/or a user identifier associated with the user. The one or more options can include one or more rules and/or one or more conditions that can be used to generate the inactivity criteria associated with inactivity of the computing device. For example, the one or more options can include at least one option associated with a device identifier (e.g., a number used to uniquely identify a particular computing device) and/or a user identifier (e.g., the name of a user). Further, the options can include an option to set the predetermined amount of time (e.g., an amount of time in hours, days, weeks, and/or months) used to determine whether the computing device was active or inactive.

The computing system can generate the device policy based at least in part on the one or more inputs. The computing system can use the one or more inputs to the one or more options to generate an expression (e.g., an expression that can include an application specific query) that can be used as the basis of the device policy. For example, the one or more options can be used to generate and/or configure a device policy in which a group of users (e.g., managers of the user) will receive a notification that a computing device associated with a particular user has been inactive for a period of time that exceeds the valid inactivity time period of the device policy.

The disclosed technology can include a computing system and/or computing device that is configured to perform various operations associated with the determination of device status and activity. In some embodiments, the user computing system can be associated with various computing systems and/or devices that use, send, receive, and/or generate information and data associated with the determination of device status and activity. Furthermore, the user computing system can process, generate, modify, and/or access (e.g., send and/or receive) data and/or information including data and/or information associated with one or more device policies, one or more organizational policies, organizational data, and/or one or more organizational records.

In some implementations, the disclosed computing system can be operated from a server computing system that may be accessed by a user via one or more computing devices that are connected to the server computing system. Further, the disclosed computing system can be configured to access organizational records that may be stored locally and/or at remote locations that are accessible via a communications network (e.g., a Local Area Network (LAN) and/or the Internet).

The computing device can include specialized hardware and/or software that enables the performance of one or more operations specific to the disclosed technology. The user computing system can include one or more application specific integrated circuits that are configured to perform operations associated with the determination of the status and/or activity of one or more computing devices.

The systems, methods, devices, apparatuses, and tangible non-transitory computer-readable media in the disclosed technology can provide a variety of technical effects and benefits including improvements in checking the status and activity (or inactivity) of computing devices. In particular, the disclosed technology may assist a user (e.g. an administrator of device policies for an organization) in performing a technical task by means of a continued and/or guided human-machine interaction process in which the user can interact with a user interface that can be used to generate and/or implement a device policy that is used to determine whether the time period during which a device is inactive is valid. Furthermore, the disclosed technology may also provide benefits including improvements in computing resource usage efficiency and device security.

The disclosed technology can provide a variety of technical effects and benefits with respect to the efficiency of computing resource usage by reducing the number of different operations involved in implementing a device policy. By using organizational data as a basis for generating a device policy, the disclosed technology can access a centralized source of information that can provide information on interactions between members of an organization and their related computing devices that may be burdensome when the member information or device information is dealt with on an individual basis. In this way, the fragmented approach in which different sets of devices are individually accessed can be reduced and/or avoided, thereby reducing the number of operations that must be performed and freeing up valuable computing resources.

The disclosed technology can increase the utilization ratio of an organization's computing resources by more effectively identifying computing devices that satisfy inactivity criteria associated with being inactive for longer than a threshold period of time. The inactive computing devices can then be reassigned to other users or, in instances where the computing device is inactive due to malfunction, the computing device can be repaired or otherwise returned to proper working order. As such, the utilization ratio of computing devices can be increased, thereby reducing the wasted computing resources that result from inactive computing devices with issues that have not been addressed.

Furthermore, the disclosed technology can be used in the generation of device policies that are applicable to large groups of users and their associated computing devices. By implementing device policies that apply to large groups of users, the disclosed technology can avoid the duplication of effort that may result from managing users or computing devices one at a time. Further, the use of criteria in the device policy may result in more coherent and consistent organizational data due to a reduction in the amount of conflicting information and/or instructions in the organizational data since the criteria ensure that the device policy is in compliance with existing organizational policies.

Additionally, the disclosed technology offers increased ease of use for users by allowing the generation or configuration of custom tailored device policies that can cover a wider range of use cases in a shorter amount of time, and with greater precision than blanket approach in which generic device policies that may be too restrictive for some users and too lax for other users are implemented. Further, the highly configurable nature of the disclosed technology allows users to create device policies that leverage the employee relationships and organizational structure of the underlying organization.

As such, the disclosed technology may assist a user in more effectively performing a variety of device policy oriented tasks by providing the specific benefits of improved computing resource usage efficiency, improved organizational data coherence and consistency, customizability, and ease of use. Further, any of the specific benefits provided to users can be used to improve the effectiveness of a wide variety of devices and services including any devices or services that rely on the disclosed technology. Accordingly, the improvements offered by the disclosed technology can result in tangible benefits to a variety of applications, devices, and/or systems including mechanical, electronic, and computing systems associated with the generation, configuration, and implementation of device policies.

With reference to the Figures, example embodiments of the present disclosure will be discussed in further detail.

FIG. 1 depicts a block diagram of an example environment including a computing system that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the Internet. Further, the network 102 can include any number of wired or wireless connections and/or links that can be used to communicate with one or more systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems and/or one or more computing devices. Further, the computing system 110 may be connected (e.g., networked) to one or more computing systems and/or one or more computing devices via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet), a wearable computing device (e.g., a smartwatch), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can be include any processing device (e.g., a processor core, a microprocessor, an ASIC, a FPGA, a controller, or a microcontroller) and can include one processor or a plurality of processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random access memory (RAM), read only memory (ROM), EEPROM, EPROM, one or more flash memory devices, one or more magnetic storage devices (e.g., one or more hard disk drives).

The one or more processors 114 can be configured to execute one or more instructions to perform the operations described herein including for example, one or more operations associated with configuring and/or generating a device policy and implementing the device policy. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include accessing organizational data based on a device policy, determining a valid inactivity time period, determining whether inactivity criteria associated with a computing device are satisfied, and performing one or more operations if the inactivity criteria are satisfied.

The data 118 can include organizational data (e.g., organizational data that can include one or more organizational records) and/or device policy data (e.g., device policy data that includes one or more rules and/or one or more conditions used to configure a device policy are described herein. Further, the instructions 120 can include one or more instructions to use data including the data 118 to perform the one or more operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more devices that may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with implementing a device policy) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computing software applications) that can be stored and/or executed by the remote computing system 130. Further, the data 138 can include one or more portions of the organizational data (e.g., one or more organizational records) and/or the device policy data.

Figure 2:
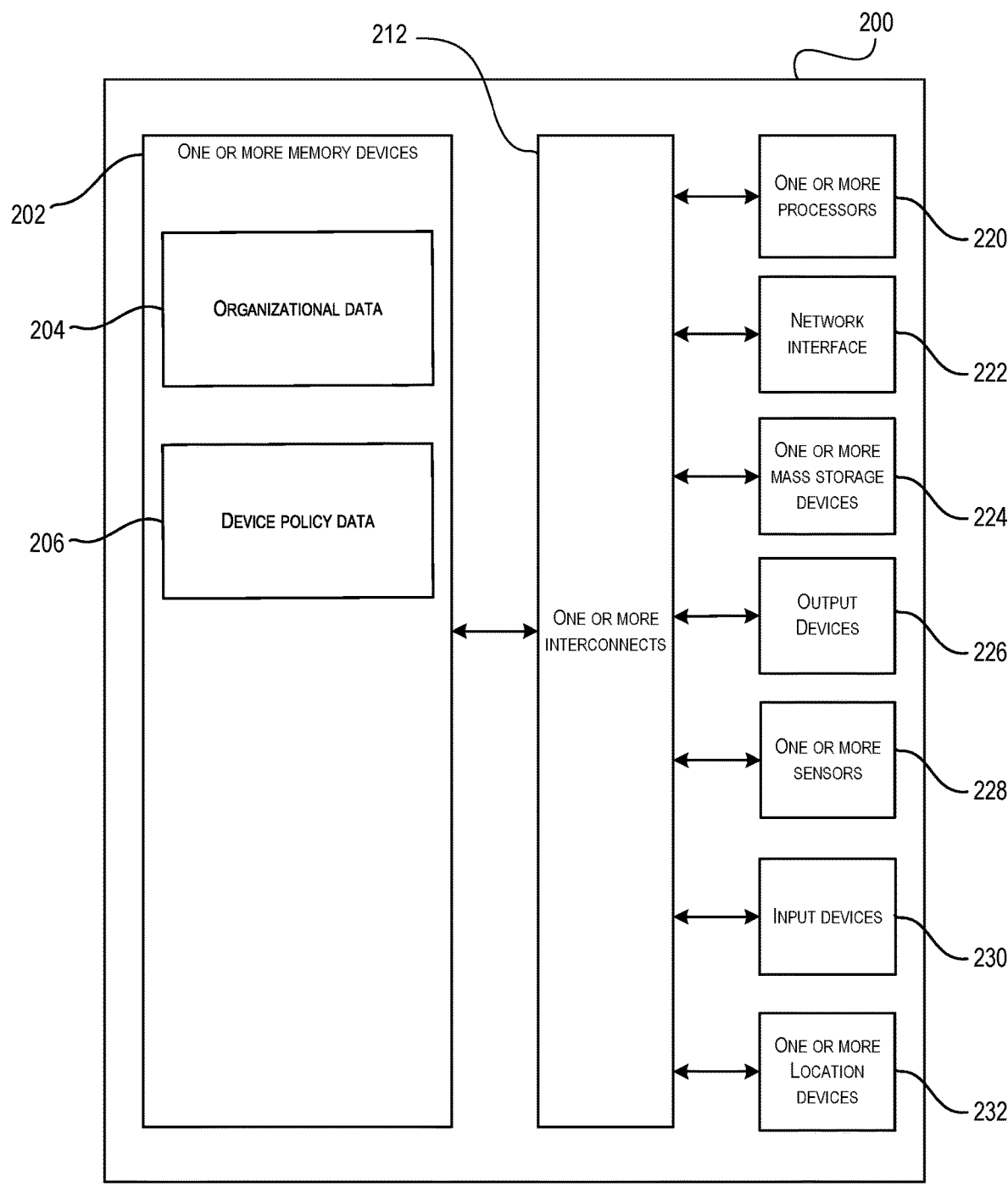
FIG. 2 depicts a block diagram of an example of a computing device according to example embodiments of the present disclosure.

FIG. 2 depicts a block diagram of an example computing device according to example embodiments of the present disclosure. A computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 204, device policy data 206, one or more interconnects 212, one or more processors 220, a network interface 222, one or more mass storage devices 224, one or more output devices 226, one or more sensors 228, one or more input devices 230, and/or the location device 232.

The one or more memory devices 202 can store information and/or data (e.g., the organizational data 204, the device policy data 206, and/or the organizational policy data 208). Further, the one or more memory devices 202 can include one or more non-transitory computer-readable storage media, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform one or more operations including accessing organizational data based on a device policy, determining a valid inactivity time period, determining whether inactivity criteria associated with a computing device are satisfied, and performing one or more operations if the inactivity criteria are satisfied. In some embodiments, the one or more memory devices 202 can include instructions that when executed by the one or more processors 220 cause the computing device to check-in to a remote computing device (e.g., the computing system 110 and/or the remote computing system 130) in order to indicate that the computing device 200 is active.

The organizational data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational data 204 can include information associated with one or more computing devices and/or one or more device policies (e.g., a device policy for the computing device of a user). In some embodiments, the organizational data 204 can be received from one or more computing systems (e.g., the remote computing system 130 depicted in FIG. 1) which can include one or more computing systems that are remote (e.g., in another room, building, part of town, city, or nation) from the computing device 200.

The device policy data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the device policy data 206 can include information associated with one or more instructions that are used to implement a device policy associated with organizational data and/or one or more computing devices that can be used by one or more users/employees of an organization. The computing device 200 can be subject to the device policy. Further, the activity or inactivity of the computing device 200 can be monitored and/or tracked in accordance with the device policy. In some embodiments, the device policy data 206 can be received from one or more computing systems (e.g., the computing system 110 and/or the remote computing system 130 depicted in FIG. 1) which can include one or more computing systems that are remote from the computing device 200.

The one or more interconnects 212 can include one or more interconnects or buses that can be used to send and/or receive one or more signals (e.g., electronic signals) and/or data (e.g., the organizational data 204, the device policy data 206, between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the location device 232. The one or more interconnects 212 can be arranged or configured in different ways. For example, the one or more interconnects 212 can be configured as parallel or serial connections. Further the one or more interconnects 212 can include: one or more internal buses that are used to connect the internal components of the computing device 200; and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 204, and/or the device policy data 210. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing system 110 via the network 102.

The one or more mass storage devices 224 (e.g., a hard disk drive and/or a solid state drive) can be used to store data including the organizational data 204, the device policy data 206, and/or the organizational policy data 208. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of configuring a device policy. For example, the one or more sensors 228 can be used as part of the process of authenticating the identity of a user and determining an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more applications that run on the computing device 200) that may be subject to one or more device policies that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with other computing devices and/or computing systems including the computing system 110, the remote computing system 130, and/or the one or more computing devices 152 that are depicted in FIG. 1. Further, the software applications that can be operated and/or executed by the computing device 200 can include native applications, web services, and/or web-based applications.

The location device 232 can include one or more devices or circuitry for determining the position of the computing device 200. For example, the location device 232 can determine an actual position and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or beacons.

Figure 3:
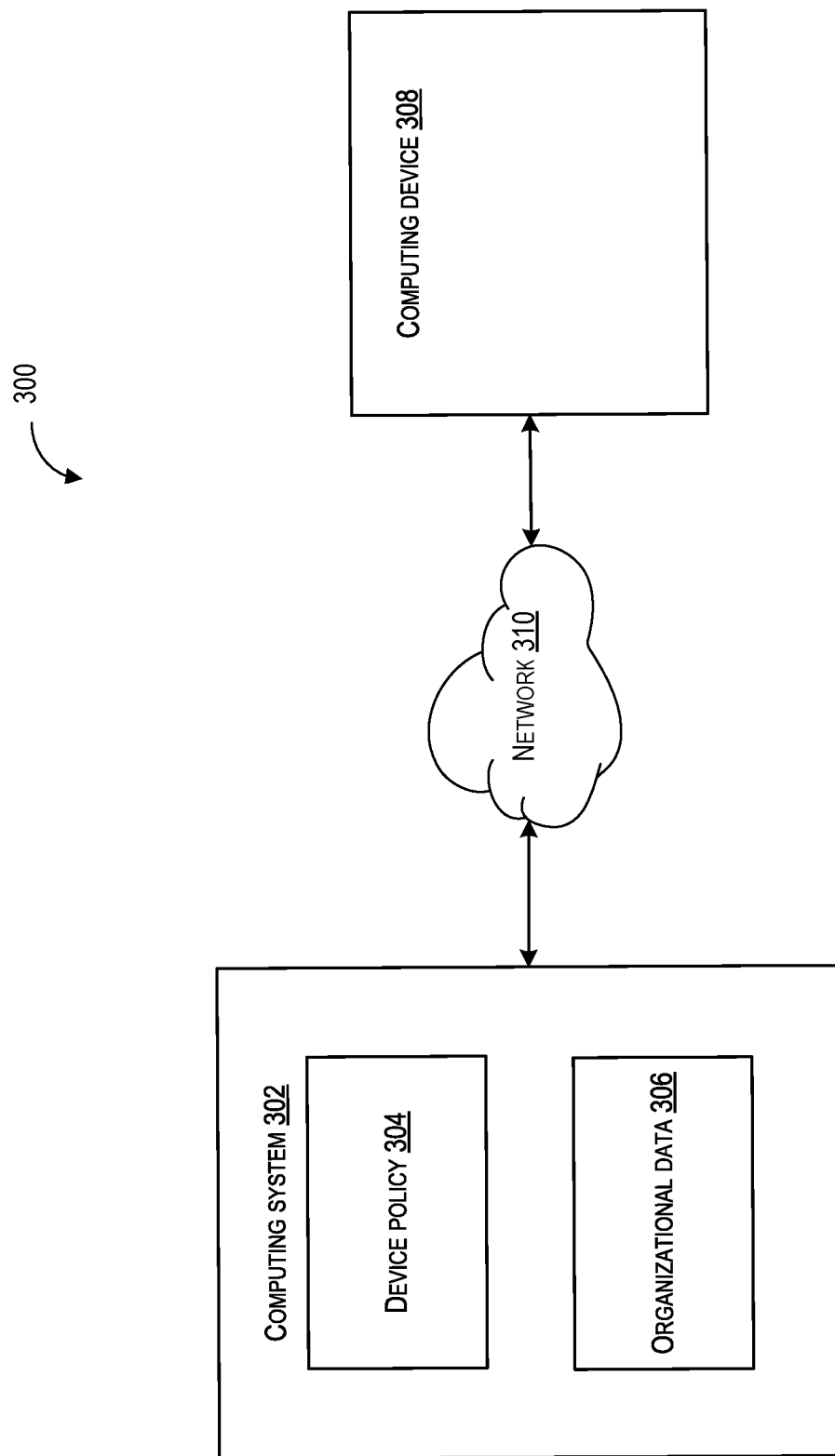
FIG. 3 depicts a block diagram of an example environment including a computing system and computing device according to example embodiments of the present disclosure.

FIG. 3 depicts a block diagram of an example environment including computing systems according to example embodiments of the present disclosure. The computing system 302 and/or the computing device 308 can include one or more attributes and/or capabilities of the computing system 110, the remote computing system 130, the one or more computing devices 152, and/or the computing device 200. Furthermore, the computing system 302 and/or the computing device 308 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, a device policy 304, organizational data 306, the computing device 308, and a communication network 310.

In this example, the computing system 302 and/or the computing device 308 can be configured to communicate directly and/or via the communication network 310 (e.g., a communication network with any of the attributes and/or capabilities of the network 102 depicted in FIG. 1). In one embodiment, the computing device 308 is operated by a user (e.g., an employee of an organization) and can communicate (e.g., send and/or receive data and/or information) with one or more computing systems including the computing system 302. The computing device 308 can be a smartphone computing device that is assigned to the user by an organization that operates the computing system 302. Further, the organizational data 306 of the computing system 302 can include a computing device identifier that can be used to uniquely identify the computing device 308 and a user identifier that can be used to uniquely identify the user of the computing device 308.

The computing system 302 can perform one or more operations associated with implementing the device policy 304. The device policy 304 can be used to determine whether valid inactivity criteria associated with the activity and/or inactivity of the computing device 308 have been satisfied. Further, the device policy 304 can use the organizational data 306 that is associated with the state of the computing device 308 to perform one or more operations associated with determining whether the computing device 308 is active and/or validly inactive.

Figure 4:
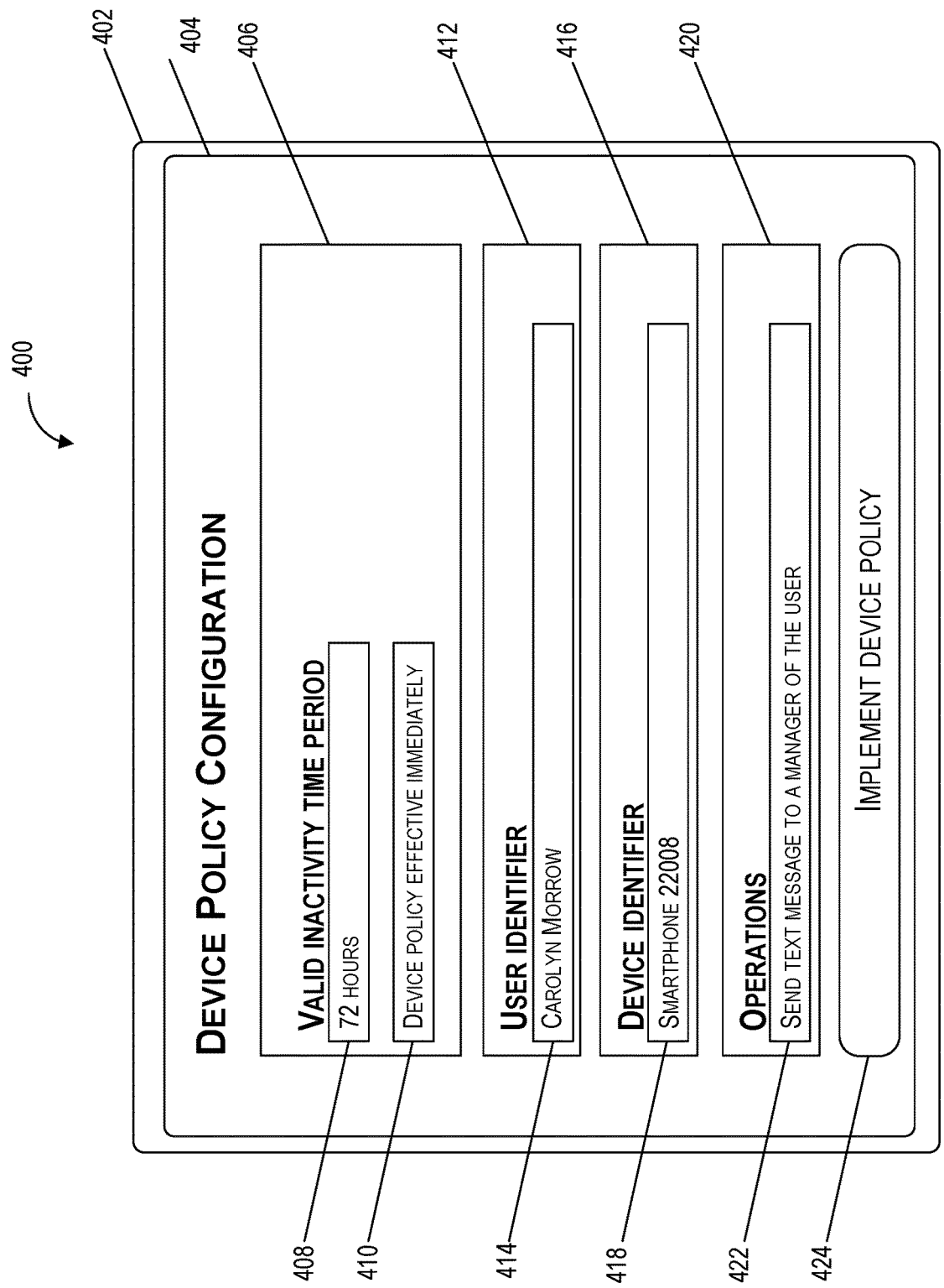
FIG. 4 depicts an example of a computing device implementing a device policy configuration interface according to example embodiments of the present disclosure.

FIG. 4 depicts an example of a computing device implementing a device policy configuration interface according to example embodiments of the present disclosure. A computing device 400 can include one or more attributes and/or capabilities of the computing system 110, the remote computing system 130, the one or more computing devices 152, and/or the computing device 200. Furthermore, the computing device 400 can be configured to perform one or more operations and/or one or more actions that can be performed by the computing system 110, the remote computing system 150, the one or more computing devices 152, and/or the computing device 200.

As shown in FIG. 4, the computing device 400 includes a display component 402, a user interface 404, an interface element 406, a field 408, an interface element 412, a field 414, an interface element 416, a field 418, an interface element 420, a field 422, and the interface element 424.

In this example, the computing device 400 is configured to generate output including the user interface 404 (e.g., a graphical user interface) that can be used to display information associated with the configuration of a device policy. Further, the user interface 404 is configured to receive one or more user inputs that can be used to configure the device policy. Further, the computing device 400 is configured to generate a device policy based at least in part on the fields and corresponding field values that are provided via the user interface 404.

The user interface 404 includes the interface element 406, the interface element 412, and the interface element 416 which are also displayed on the display component 402. As shown in FIG. 4, the interface element 406, the interface element 412, and the interface element 416 can be used to generate and/or configure a device policy that can trigger one or more operations when the computing device of a user has been inactive for a duration that is longer than a valid inactivity time period of the device policy. The output of the computing device 400 can be based at least in part on one or more of organizational data, the device policy, and/or the state (e.g., activity and/or inactivity) of one or more computing devices that are associated with the device policy.

The display component 402 can be configured to detect one or more inputs (e.g., one or more inputs from a user) that can cause the computing device 400 to perform one or more operations (e.g., operations associated with configuring a device policy). For example, the display component 402 can include a touch-screen (e.g., a capacitive or resistive touch-screen) that is configured to receive and/or detect one or more touch inputs. The one or more touch inputs may be received from a user and may be used by the user to indicate the selection and/or adjustment of one or more of the interface elements generated on the user interface 404. Further, the computing device 400 can be configured to receive and/or detect various types of input including audio input (e.g., a user providing a vocal command to select or adjust an interface element), an external input device (e.g., a stylus, a mouse device, or keyboard), or a gesture (e.g., a user gesture that is detected and/or recognized by a camera of the computing device 400). In some embodiments, the computing device 400 can be configured to receive one or more inputs from one or more other computing devices (e.g., a laptop computer, a desktop computer, and/or a smartphone) that communicate with the computing device 400.

Any of the interface element 406, interface element 412, and interface element 416 can include one or more fields (e.g., the field 408, the field 410, the field 414, the field 418, and/or the field 422). Each of the field 408, the field 410, the field 414, the field 418, and/or the field 422 can be associated with one or more field values that can be used to configure the device policy. Further, the one or more fields can include information that is associated with one or more portions of the organizational data, the device policy, and/or one or more computing devices.

In some embodiments, any of the field 408, the field 410, the field 414, the field 418, and/or the field 422 can be configured to receive one or more expressions based at least in part on an application specific query language that can be used to generate and/or configure a device policy including the valid inactivity time period associated with the field 408. For example, the field 408 can receive an expression indicating that a valid inactivity time period with a duration of seventy-two (72) hours will be applied to the device identifier 1204 associated with the user identifier 2008 and that the operations associated with the computing device being inactive when the valid inactivity time period elapses is to inform the user's manager via e-mail.

The interface element 406 is associated with a valid inactivity time period and includes the field 408 which can receive input from a user. For example, a user can select field values associated with a duration of the valid inactivity time period including a numeric value (e.g., "72") and a unit of time "(HOURS)" to indicate that the valid inactivity time period will be seventy-two (72) hours. In another embodiment, the user can manually type in the field value (e.g., enter the field value via a pop-up keyboard displayed on the user interface 404 and/or a keyboard that is attached to the computing device 400). For example, a person configuring the device policy can enter "72 HOURS" into the field 408 to indicate the duration of the valid inactivity time period. The interface element 406 includes the field 410 which is used to indicate when the device policy will take effect. In this example, the user has selected "DEVICE POLICY EFFECTIVE IMMEDIATELY" which will implement the device policy when the user activates (e.g., presses or clicks on) the interface element 424 that will confirm the device policy and initiate implementation of the device policy.

The interface element 412 is associated with a user identifier that identifies the user associated with the device policy and includes the field 414 which can receive input from a user. For example, a user can select a name ("CAROLYN MORROW") from a list of field values respectively associated with a list of names of employees of an organization, and thereby indicate the user of a computing device associated with a device policy. In another embodiment, the user can manually type in the field value (e.g., enter the field value via a pop-up keyboard displayed on the user interface 404 and/or a keyboard that is attached to the computing device 400). For example, a person configuring the device policy can enter "CAROLYN MORROW" into the field 414 to indicate the name of the user.

The interface element 416 is associated with a device identifier that identifies the computing device associated with the device policy. The interface element 416 includes the field 418 which can receive input from a user. For example, a user can select a computing device ("SMARTPHONE 22008") from a list of field values respectively associated with a list of names of employees of an organization, and thereby indicate the user of a computing device associated with a device policy. The list of field values provided in the field 418 can be based at least in part on the user identifier associated with the field 414. For example, when a user identifier is associated with multiple device identifiers, the list of field values in the field 418 can include the multiple device identifiers (e.g., multiple computing devices that are assigned to a particular user). In another embodiment, the user can manually type in the field value (e.g., enter the field value via a pop-up keyboard displayed on the user interface 404 and/or a keyboard that is attached to the computing device 400). For example, a person configuring the device policy can enter "SMARTPHONE 22008" into the field 414 to indicate the device identifier associated with a smartphone assigned to the user.

The interface element 420 is associated with an output and/or one or more operations that will be performed when inactivity criteria associated with the device policy are satisfied. In this example, satisfaction of the inactivity criteria can result in generating and sending a text message notification to the user of the computing device or a manager associated with the user. For example, the computing device 400 can access the organizational data and determine the user's manager based at least in part on one or more relationships that are indicated in the organizational data. The computing device 400 can then generate the notification indicating that the user's computing device has been inactive for longer than the valid inactivity time period and send the notification to the user's manager.

Figure 5:
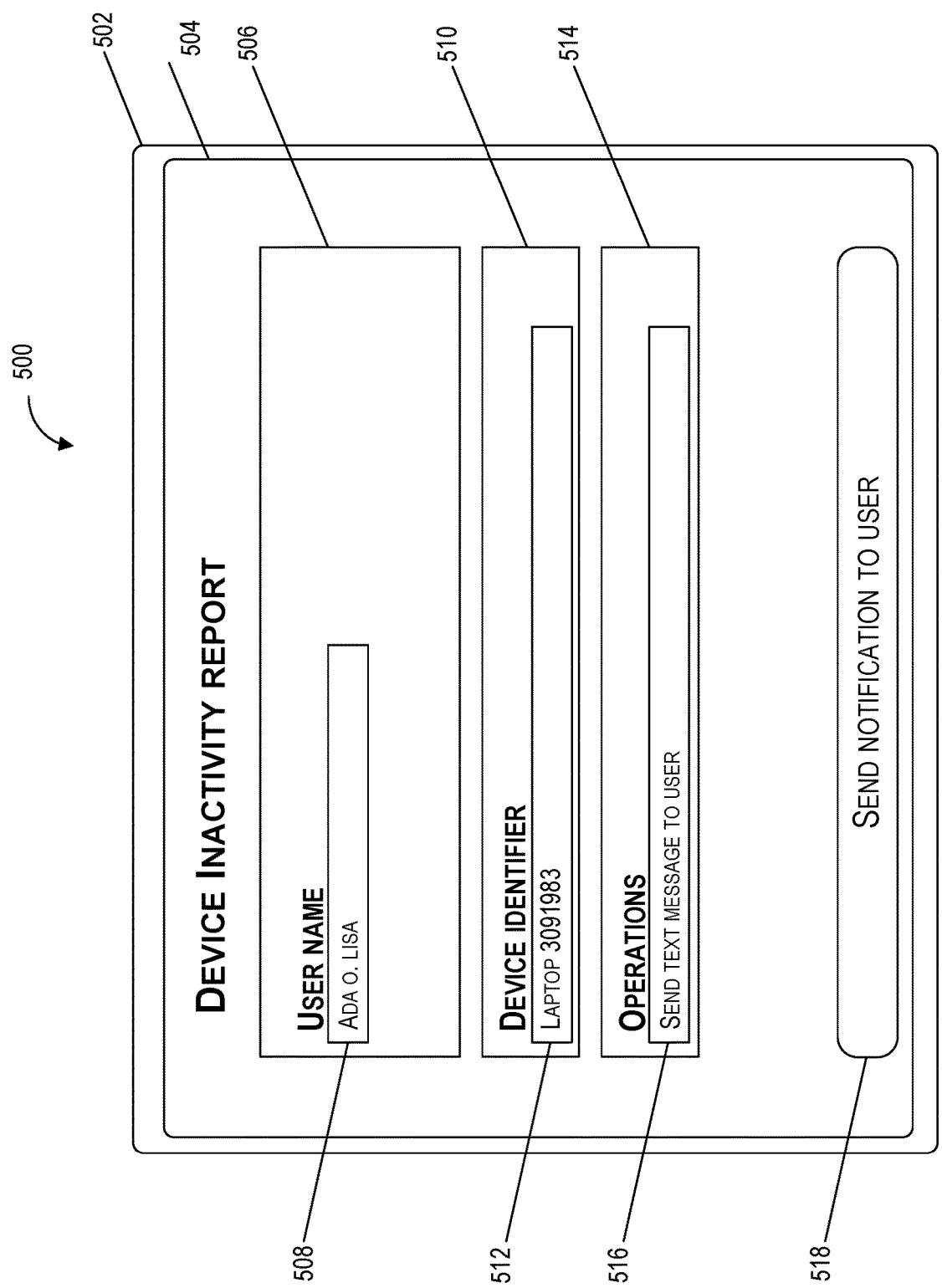
FIG. 5 depicts an example of a computing device generating a device inactivity report according to example embodiments of the present disclosure.

FIG. 5 depicts an example of a computing device generating a device inactivity report according to example embodiments of the present disclosure. A computing device 500 can include one or more attributes and/or capabilities of the computing system 110, the remote computing system 130, the one or more computing devices 152, and/or the computing device 200. Furthermore, the computing device 500 can be configured to perform one or more operations and/or one or more actions that can be performed by the computing system 110, the remote computing system 150, the one or more computing devices 152, and/or the computing device 200.

As shown in FIG. 5, the computing device 500 includes a display component 502, a user interface 504, an interface element 506, a field 508, an interface element 510, an interface element 514, a field 516, and an interface element 518.

In this example, the computing device 500 is configured to generate output including the user interface 504 (e.g., a graphical user interface) that can be used to display information associated with a device inactivity report associated with a device policy. Further, the user interface 504 is configured to receive one or more user inputs that can be used to perform one or more operations associated with the device inactivity report (e.g., send a notification to a user of an inactive computing device).

The user interface 504 includes the interface element 506, the interface element 510, and the interface element 514 which are also displayed on the display component 502. As shown in FIG. 5, the interface element 506, the interface element 510, and the interface element 514 can be used to display a report including the user name, device identifier, and operations associated with a computing device of the user that has been inactive for a duration that is longer than a valid inactivity time period of a device policy. The output of the computing device 500 can be based at least in part on one or more of organizational data, the device policy, and/or the state (e.g., activity and/or inactivity) of one or more computing devices that are associated with the device policy.

The display component 502 can be configured to detect one or more inputs (e.g., one or more inputs from a user) that can cause the computing device 500 to perform one or more operations (e.g., operations associated with configuring a device policy). For example, the display component 502 can include a touch-screen (e.g., a capacitive or resistive touch-screen) that is configured to receive and/or detect one or more touch inputs. The one or more touch inputs may be received from a user and may be used by the user to indicate the selection and/or adjustment of one or more of the interface elements generated on the user interface 504. Further, the computing device 500 can be configured to receive and/or detect various types of input including audio input (e.g., a user providing a vocal command to select or adjust an interface element), an external input device (e.g., a stylus, a mouse device, or keyboard), or a gesture (e.g., a user gesture that is detected and/or recognized by a camera of the computing device 500). In some embodiments, the computing device 500 can be configured to receive one or more inputs from one or more other computing devices (e.g., a laptop computer, a desktop computer, and/or a smartphone) that communicate with the computing device 500.

Any of the interface element 506, interface element 510, and interface element 514 can include one or more fields (e.g., the field 508, the field 512, and/or the field 516). Each of the field 508, the field 512, and/or the field 516 can be associated with one or more field values of the device inactivity report. Further, the one or more fields can include information that is associated with one or more portions of the organizational data, the device policy, and/or one or more computing devices.

The interface element 506 includes the field 508, which is associated with the user name associated with the computing device associated with the device inactivity report. In this example, the user name is "ADA O. LISA." In some embodiments, the user name in the field 508 can include an organizational title of the user. For example, "ADA O. LISA" may be a department head and the user name could indicate "ADA O. LISA, DEPARTMENT HEAD."

The interface element 510 is associated with a device identifier that identifies the computing device associated with the device inactivity report. The interface element 510 includes the field 512 that indicates the device identifier ("LAPTOP 3091983") that can be used to uniquely identify the computing device associated with the user.

The interface element 514 is associated with an output and/or one or more operations that can be performed as a follow-up action to the device inactivity report. The person viewing the report can select an operation to perform from a list of operations provided in the field 516. In this example, the selected operation is to "SEND A TEXT MESSAGE TO THE USER" which can be sent via some alternative device of the user that is different from the computing device associated with the device inactivity report. Other operations to perform could, for example, include deactivating the associated computing device or sending an e-mail message to a manager of the user. In some embodiments, the computing device 500 can access organizational data and determine any alternative computing devices of the user that are active.

The interface element 518 can be configured to send a notification associated with the device inactivity report to the user when one or more inputs are received. For example, the computing device 500 can access the organizational data and determine the user's telephone number. The computing device 500 can then generate the notification indicating that the user's computing device has been inactive for longer than the valid inactivity time period and send a text message including the notification to the user.

Figure 6:
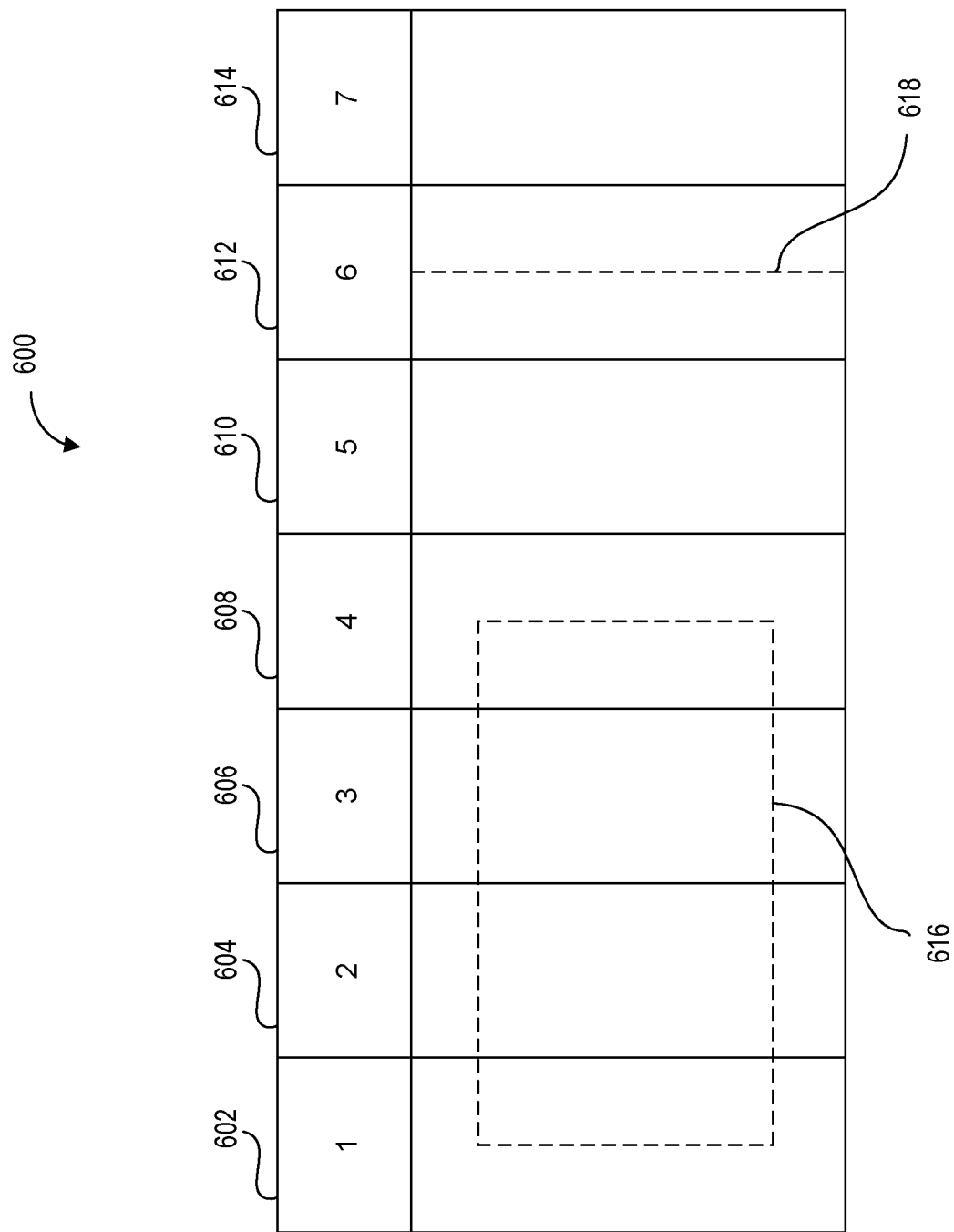
FIG. 6 depicts an example of organizational data according to example embodiments of the present disclosure.

FIG. 6 depicts an example of organizational data that includes a plurality of time periods according to example embodiments of the present disclosure. The organizational data 600 can be stored and/or used by a computing device that includes one or more attributes and/or capabilities of the computing system 110, the remote computing system 130, the one or more computing devices 152, and/or the computing device 200. Furthermore, the organizational data 600 can be used as the basis for the performance of one or more operations and/or one or more actions by the computing system 110, the remote computing system 150, the one or more computing devices 152, and/or the computing device 200.

As shown in FIG. 6, the organizational data 600 includes information associated with a time period 602, a time period 604, a time period 606, a time period 608, a time period 610, a time period 612, a time period 614, a valid inactivity time period 616, and a current time 618. The time periods including the time period 602, the time period 604, the time period 606, the time period 608, the time period 610, the time period 612, and the time period 614 are continuous and each of the time periods can have the same duration (e.g., a duration of twenty-four hours).

The valid inactivity time period 616 can be a period of time that is defined by a device policy of a computing system (e.g., the computing system 110). Further, the valid inactivity time period 616 can indicate an amount of time during which a computing device (e.g., the computing device 200) can remain validly inactive (e.g., the computing device can remain inactive without triggering some action (e.g., performance of one or more operations to notify someone of the inactivity of the computing device) by a computing system that monitors and/or tracks the activity and/or status of the computing device).

The valid inactivity time period 616 begins at, and includes a portion of, the time period 602, the time period 604, the time period 606, and a portion of the time period 608. Further, the current time 618 is after the end of the valid inactivity time period 616. In this example, the device policy includes instructions that indicate that inactivity criteria (e.g., criteria indicating that a computing device has been inactive beyond the end of the valid inactivity time period 616). Based at least in part on the valid inactivity time period 616 ending before the current time 618, a computing system (e.g., the computing system 110) can perform one or more operations including, for example, sending a notification to a manager of the computing device that is associated with the valid inactivity time period 616 and inactive for longer than the valid inactivity time period 616.

Figure 7:
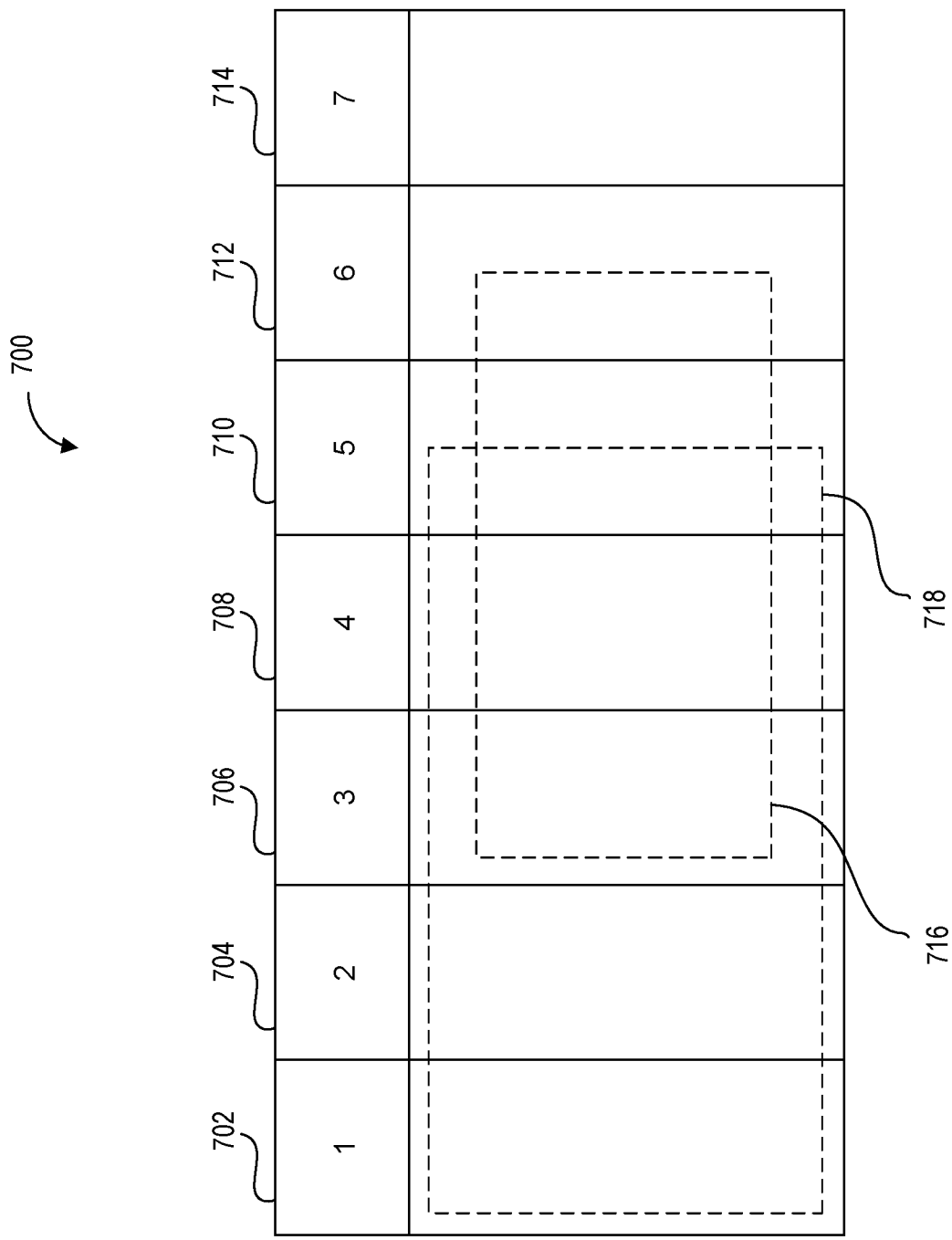
FIG. 7 depicts an example of organizational data according to example embodiments of the present disclosure.

FIG. 7 depicts an example of organizational data that includes a plurality of time periods according to example embodiments of the present disclosure. The organizational data 700 can be stored and/or used by a computing device that includes one or more attributes and/or capabilities of the computing system 110, the remote computing system 130, the one or more computing devices 152, and/or the computing device 200. Furthermore, the organizational data 700 can be used as the basis for the performance of one or more operations and/or one or more actions by the computing system 110, the remote computing system 150, the one or more computing devices 152, and/or the computing device 200.

As shown in FIG. 7, the organizational data 700 includes information associated with a time period 702, a time period 704, a time period 706, a time period 708, a time period 710, a time period 712, a time period 714, a valid inactivity time period 716, and an employment time period 718. The time periods including the time period 702, the time period 704, the time period 706, the time period 708, the time period 710, the time period 712, and the time period 714 are continuous and each of the time periods can have the same duration (e.g., a duration of twenty-four hours).

The valid inactivity time period 716 can be a period of time that is defined by a device policy of a computing system (e.g., the computing system 110). Further, the valid inactivity time period 716 can indicate an amount of time during which a computing device (e.g., the computing device 200) can remain validly inactive (e.g., the computing device can remain inactive without triggering some action (e.g., performance of one or more operations) by a computing system that monitors and/or tracks the activity and/or status of the computing device).

The valid inactivity time period 716 begins at, and includes a portion of, the time period 706 and also includes the time period 708, the time period 710, and a portion of the time period 712. Further, the employment time period 718 represents a portion of the time during which a user that is an employee of an organization was employed by the organization associated with the device policy of the computing device. In this example, the employment time period 718 includes a portion of the time period 702, the time period 704, the time period 706, the time period 708, and a portion of the time period 710. As such, the employment time period 718 ends before the valid inactivity time period 716 ends, which means that the employee was not employed by the organization for the entirety of the valid inactivity time period 716. Accordingly, inactivity criteria (employee status) associated with the device policy being applied to a computing device of an employee of the organization that was not employed by the organization for the entirety of the valid inactivity time period 716 are satisfied. In the event that the employee was not employed for the entirety of the valid inactivity time period 716, a manager of the device policy could be notified and different operations could be performed to address the issue of the user not being employed during the valid inactivity time period 716 (e.g., the associated computing device can be deactivated and/or reassigned to a different user). In some embodiments, the end of the employee's employment with the organization can trigger the notification to the manager at which time some action such as deactivating the computing device may be performed.

In this example, the device policy associated with the organizational data 700 can include inactivity criteria (e.g., criteria indicating associated with the valid inactivity time period 716) associated with the employment time period 718. Based at least in part on the employment time period 718 encompassing the entirety of the valid inactivity time period 716, a computing system (e.g., the computing system 110) can perform one or more operations including, for example, sending a notification to a manager of the computing device that is associated with the valid inactivity time period 716.

Figure 8:
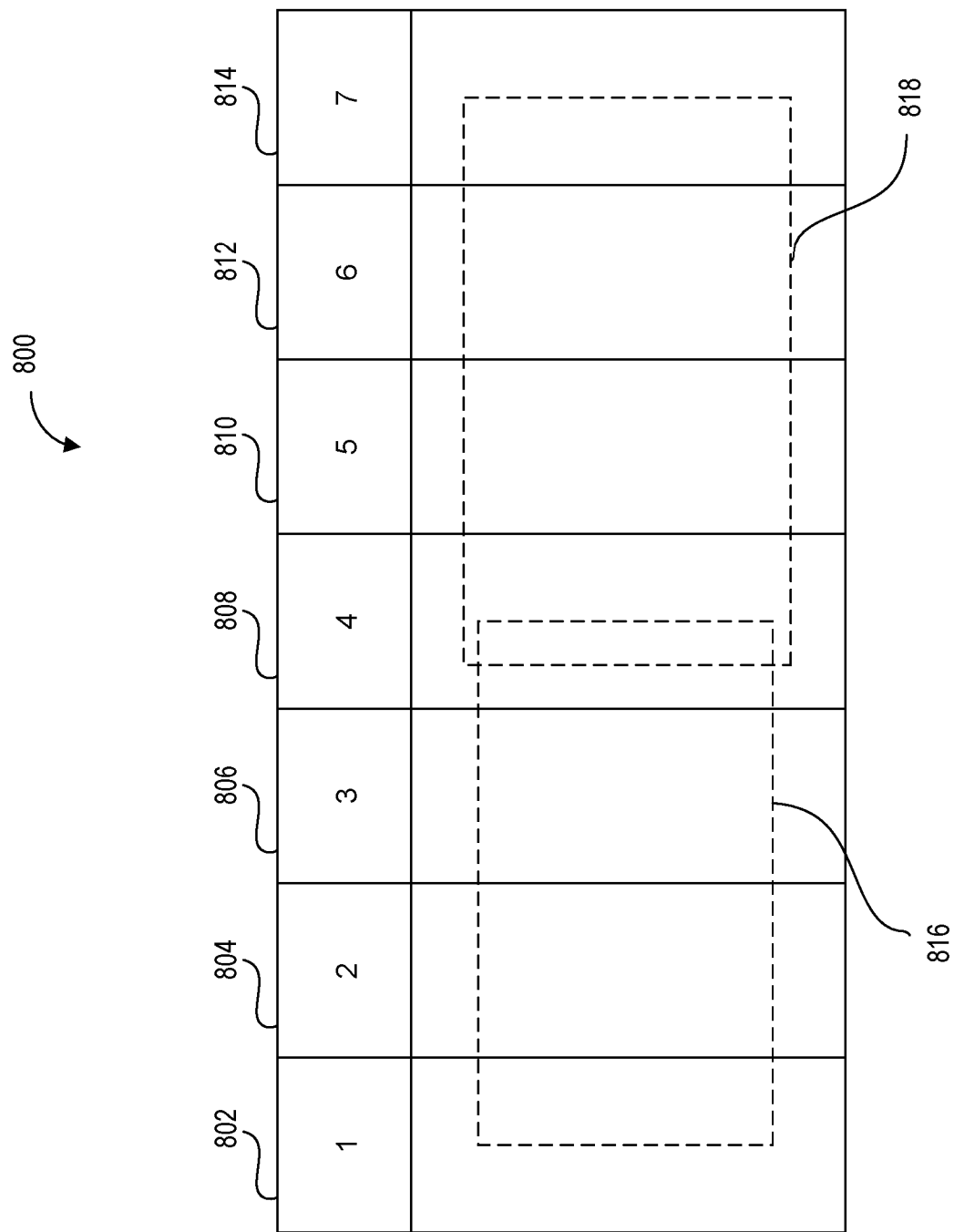
FIG. 8 depicts an example of organizational data according to example embodiments of the present disclosure.

FIG. 8 depicts an example of organizational data that includes a plurality of time periods according to example embodiments of the present disclosure. The organizational data 800 can be stored and/or used by a computing device that includes one or more attributes and/or capabilities of the computing system 110, the remote computing system 130, the one or more computing devices 152, and/or the computing device 200. Furthermore, the organizational data 800 can be used as the basis for the performance of one or more operations and/or one or more actions by the computing system 110, the remote computing system 150, the one or more computing devices 152, and/or the computing device 200.

As shown in FIG. 8, the organizational data 800 includes information associated with a time period 802, a time period 804, a time period 806, a time period 808, a time period 810, a time period 812, a time period 814, a one or more organization approved time periods of valid inactivity 816, and a scheduled time period 818. The time periods including the time period 802, the time period 804, the time period 806, the time period 808, the time period 810, the time period 812, and the time period 814 are continuous and each of the time periods can have the same duration (e.g., a duration of twenty-four hours).

The one or more organization approved time periods of valid inactivity 816 can include a continuous period of time that is defined by a device policy of a computing system (e.g., the computing system 110). The one or more organization approved time periods of valid inactivity 816 can indicate an amount of time during which a computing device (e.g., the computing device 200) can remain validly inactive (e.g., the computing device can remain inactive without triggering some action (e.g., performance of one or more operations) by a computing system that monitors and/or tracks the activity and/or status of the computing device).

The one or more organization approved time periods of valid inactivity 816 begin at, and include a portion of, the time period 802 and also include the time period 804, the time period 806, and a portion of the time period 808. In this example, the device policy includes instructions that indicate that inactivity criteria (e.g., criteria indicating that a computing device has been inactive beyond the end of the one or more organization approved time periods of valid inactivity 816). Further, the scheduled time period 818 represents a portion of the time during which a member (e.g., an employee) of an organization was scheduled to have one or more organization approved time periods of valid inactivity. The scheduled time period 818 begins at a portion of the time period 808 that occurs before the end of the one or more organization approved time periods of valid inactivity 816. Further, the scheduled time period 818 ends after the one or more organization approved time periods of valid inactivity 816. As such, the valid inactivity time period of the device policy includes the combination of the scheduled time period 818 and the one or more organization approved time periods of valid inactivity 816 that overlap and are continuous with the scheduled time period 818. Accordingly, inactivity criteria associated with the computing device being inactive are not satisfied until the end of the scheduled time period 818 that occurs in the time period 814.

Figure 9:
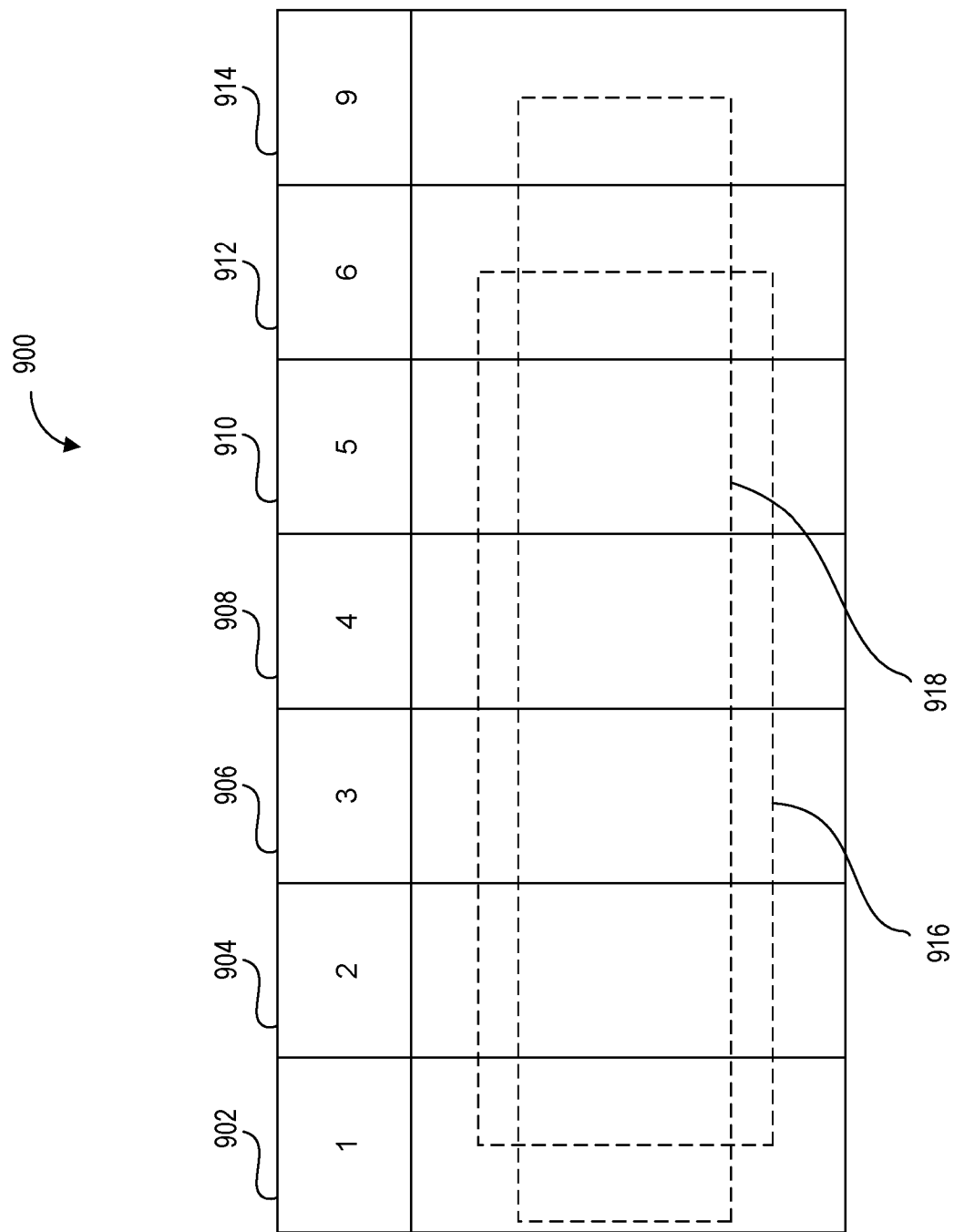
FIG. 9 depicts an example of organizational data according to example embodiments of the present disclosure.

FIG. 9 depicts an example of organizational data that includes a plurality of time periods according to example embodiments of the present disclosure. The organizational data 900 can be stored and/or used by a computing device that includes one or more attributes and/or capabilities of the computing system 110, the remote computing system 130, the one or more computing devices 152, and/or the computing device 200. Furthermore, the organizational data 900 can be used as the basis for the performance of one or more operations and/or one or more actions by the computing system 110, the remote computing system 150, the one or more computing devices 152, and/or the computing device 200.

As shown in FIG. 9, the organizational data 900 includes information associated with a time period 902, a time period 904, a time period 906, a time period 908, a time period 910, a time period 912, a time period 914, a valid inactivity time period 916, and a device assignment time period 918. The time periods including the time period 902, the time period 904, the time period 906, the time period 908, the time period 910, the time period 912, and the time period 914 are continuous and each of the time periods can have the same duration (e.g., a duration of twenty-four hours).

The valid inactivity time period 916 can be a period of time that is defined by a device policy of a computing system (e.g., the computing system 110). The valid inactivity time period 916 can indicate an amount of time during which a computing device (e.g., the computing device 200) can remain validly inactive (e.g., the computing device can remain inactive without triggering some action (e.g., performance of one or more operations) by a computing system that monitors and/or tracks the activity and/or status of the computing device).

The valid inactivity time period 916 begins at, and includes a portion of, the time period 902 and also includes the time period 904, the time period 906, the time period 908, the time period 910, the time period 912, and a portion of the time period 914. Further, the device assignment time period 918 represents a portion of time during which a particular computing device was assigned to a user by the organization associated with the device policy of the computing device. In this example, the device assignment time period 918 includes a portion of the time period 902, the time period 904, the time period 906, the time period 908, the time period 910, and a portion of the time period 912. Further, the device assignment time period 918 ends before the valid inactivity time period 916, which means that the computing device was not assigned to the user for the entirety of the valid inactivity time period 916. Accordingly, inactivity criteria associated with the computing device not being assigned to the user for the whole of the valid inactivity period 916 are satisfied. Based at least in part on the device assignment time period 918 not encompassing the entirety of the valid inactivity time period 916, a computing system (e.g., the computing system 110) can perform one or more operations including, for example, sending a notification of computing device inactivity to an alternative computing device of the user that is different from the computing device that is associated with the valid inactivity time period 916. In the event that the computing device was assigned to the user for the entirety of the valid inactivity time period 916, the inactivity criteria would not be satisfied and a manager of the device policy could not be notified and no action would be taken with respect to the inactivity criteria.

Figure 10:
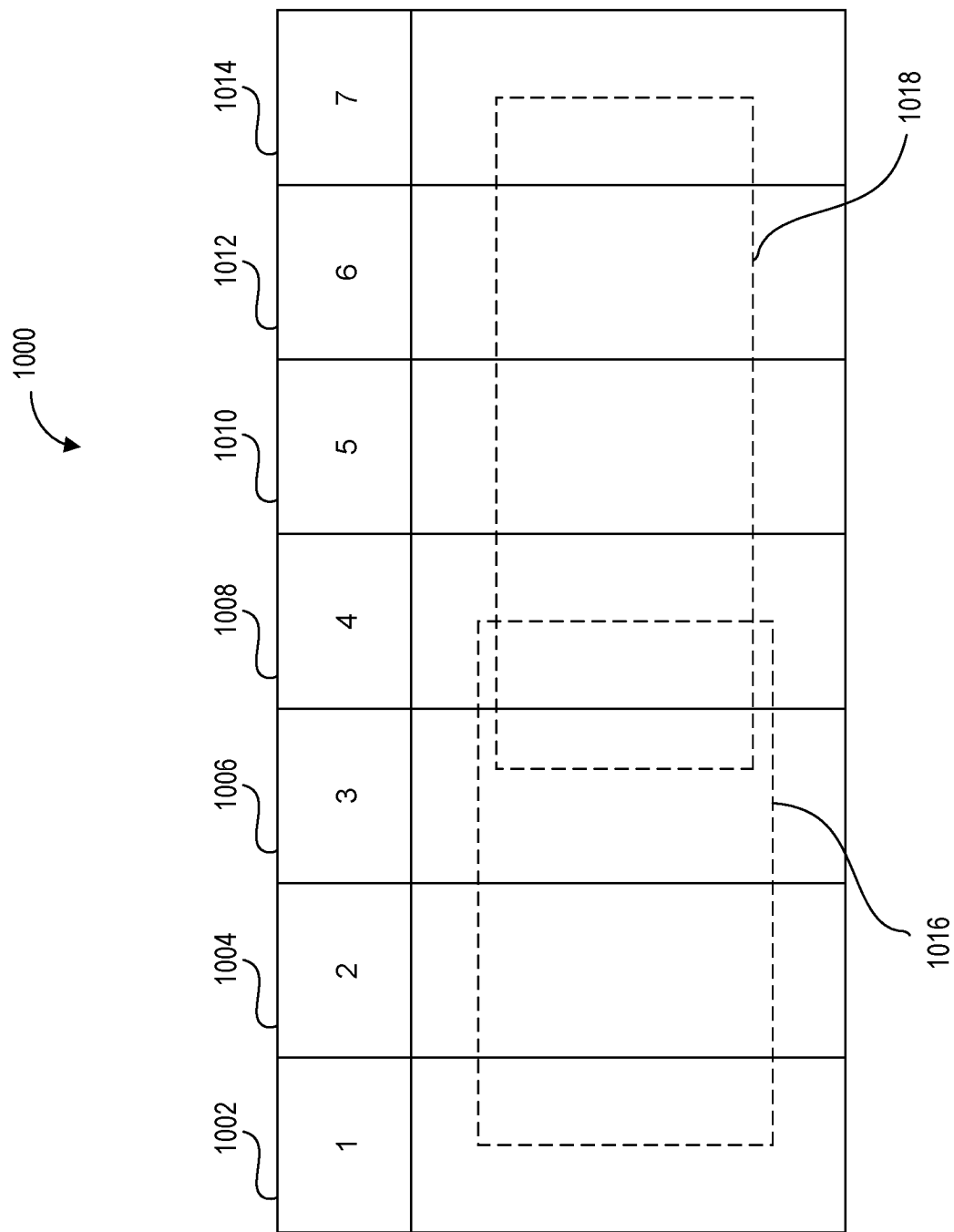
FIG. 10 depicts an example of organizational data according to example embodiments of the present disclosure.

FIG. 10 depicts an example of organizational data that includes a plurality of time periods according to example embodiments of the present disclosure. The organizational data 1000 can be stored and/or used by a computing device that includes one or more attributes and/or capabilities of the computing system 110, the remote computing system 130, the one or more computing devices 152, and/or the computing device 200. Furthermore, the organizational data 1000 can be used as the basis for the performance of one or more operations and/or one or more actions by the computing system 110, the remote computing system 150, the one or more computing devices 152, and/or the computing device 200.

As shown in FIG. 10, the organizational data 1000 includes information associated with a time period 1002, a time period 1004, a time period 1006, a time period 1008, a time period 1010, a time period 1012, a time period 1014, one or more organization approved time periods of valid inactivity 1016, and a service time period 1018. The time periods including the time period 1002, the time period 1004, the time period 1006, the time period 1008, the time period 1010, the time period 1012, and the time period 1014 are continuous and each of the time periods can have the same duration (e.g., a duration of twenty-four hours).

The one or more organization approved time periods of valid inactivity 1016 can include a period of time that is defined by a device policy of a computing system (e.g., the computing system 110). The one or more organization approved time periods of valid inactivity 1016 can indicate an amount of time during which a computing device (e.g., the computing device 200) can remain validly inactive (e.g., the computing device can remain inactive without triggering some action (e.g., performance of one or more operations) by a computing system that monitors and/or tracks the activity and/or status of the computing device).

The one or more organization approved time periods of valid inactivity 1016 can include a continuous period of time that is defined by a device policy of a computing system (e.g., the computing system 110). The one or more organization approved time periods of valid inactivity 1016 can indicate an amount of time during which a computing device (e.g., the computing device 200) can remain validly inactive (e.g., the computing device can remain inactive without triggering some action (e.g., performance of one or more operations) by a computing system that monitors and/or tracks the activity and/or status of the computing device).

The one or more organization approved time periods of valid inactivity 1016 begin at, and include a portion of, the time period 1002 and also include the time period 1004, the time period 1006, and a portion of the time period 1008. In this example, the device policy includes instructions that indicate that inactivity criteria (e.g., criteria indicating that a computing device has been inactive beyond the end of the one or more organization approved time periods of valid inactivity 1016). Further, the service time period 1018 represents a portion of the time during which a computing device was scheduled to be serviced, repaired, and/or updated and which constitute one or more organization approved time periods of valid inactivity. The service time period 1018 begins at a portion of the time period 1008 that occurs before the end of the one or more organization approved time periods of valid inactivity 1016. Further, the service time period 1018 ends after the one or more organization approved time periods of valid inactivity 1016. As such, the valid inactivity time period of the device policy includes the combination of the service time period 1018 and the one or more organization approved time periods of valid inactivity 1016 that overlap and are continuous with the service time period 1018. Accordingly, inactivity criteria associated with the computing device being inactive are not satisfied until the end of the service time period 1018 that occurs in the time period 1014.

Figure 11:
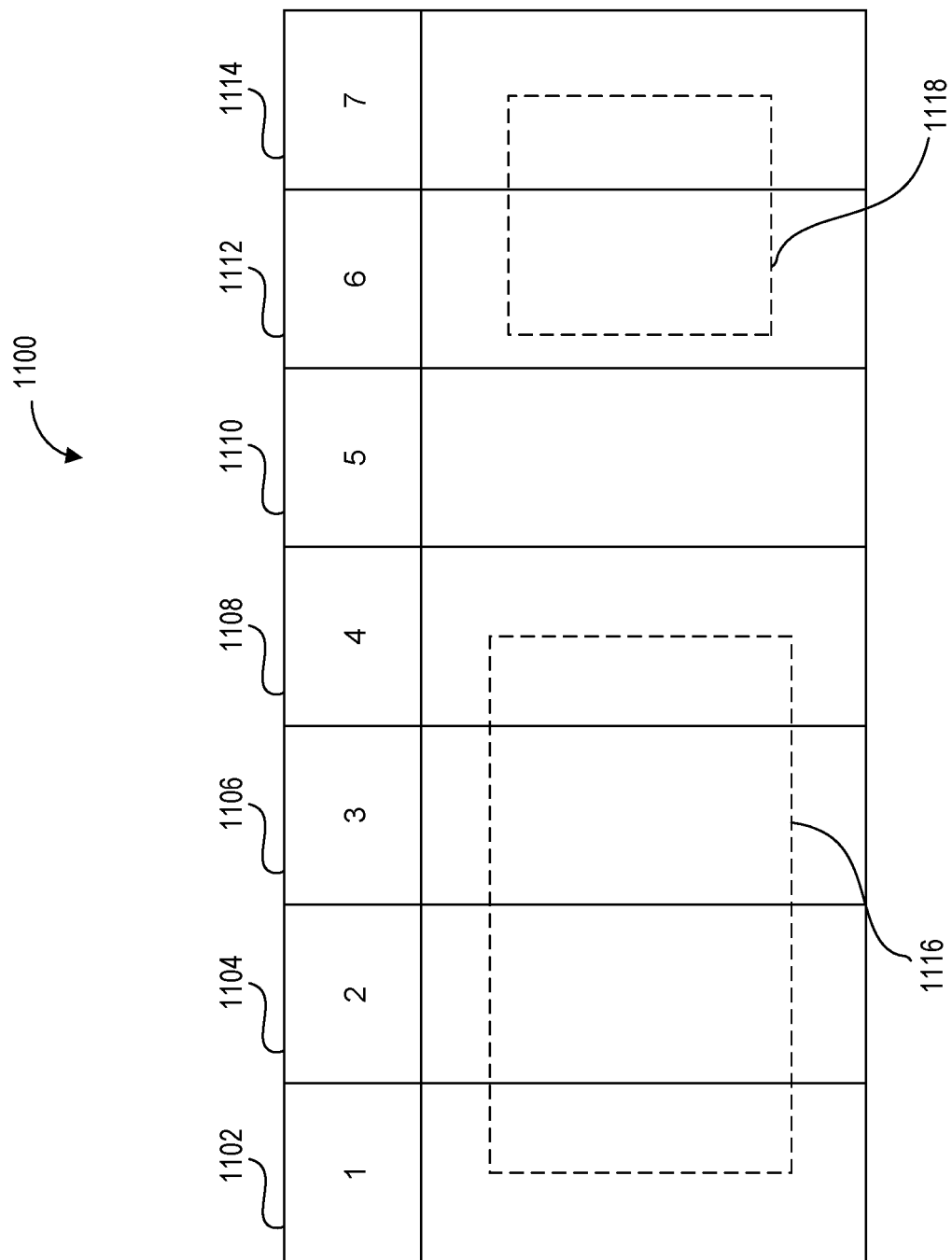
FIG. 11 depicts an example of organizational data according to example embodiments of the present disclosure.

FIG. 11 depicts an example of organizational data that includes a plurality of time periods according to example embodiments of the present disclosure. The organizational data 1100 can be stored and/or used by a computing device that includes one or more attributes and/or capabilities of the computing system 110, the remote computing system 130, the one or more computing devices 152, and/or the computing device 200. Furthermore, the organizational data 1100 can be used as the basis for the performance of one or more operations and/or one or more actions by the computing system 110, the remote computing system 150, the one or more computing devices 152, and/or the computing device 200.

As shown in FIG. 11, the organizational data 1100 includes information associated with a time period 1102, a time period 1104, a time period 1106, a time period 1108, a time period 1110, a time period 1112, a time period 1114, a valid inactivity time period 1116, and an alternative device time period 1118. The time periods including the time period 1102, the time period 1104, the time period 1106, the time period 1108, the time period 1110, the time period 1112, and the time period 1114 are continuous and each of the time periods can have the same duration (e.g., a duration of twenty-four hours).

The valid inactivity time period 1116 can be a period of time that is defined by a device policy of a computing system (e.g., the computing system 111). The valid inactivity time period 1116 can indicate an amount of time during which a computing device (e.g., the computing device 200) can remain validly inactive (e.g., the computing device can remain inactive without triggering some action (e.g., performance of one or more operations) by a computing system that monitors and/or tracks the activity and/or status of the computing device).

The valid inactivity time period 1116 begins at, and includes a portion of, the time period 1102 and also includes the time period 1104, the time period 1106, and a portion of the time period 1108. The alternative device time period 1118 begins after the end of the valid inactivity time period 1116. In this example, the device policy includes instructions that indicate that inactivity criteria (e.g., criteria indicating that a computing device has been inactive beyond the end of the valid inactivity time period 1116) are satisfied if the alternative device time period 1118 begins after the end of the valid inactivity time period 1116. The alternative device time period 1118 begins during the time period 1112 and is not continuous with the valid inactivity time period 1116 that ends during the time period 1108. Accordingly, inactivity criteria associated with the computing device being inactive are satisfied and the device policy can perform one or more operations associated with the computing device being inactive.

Figure 12:
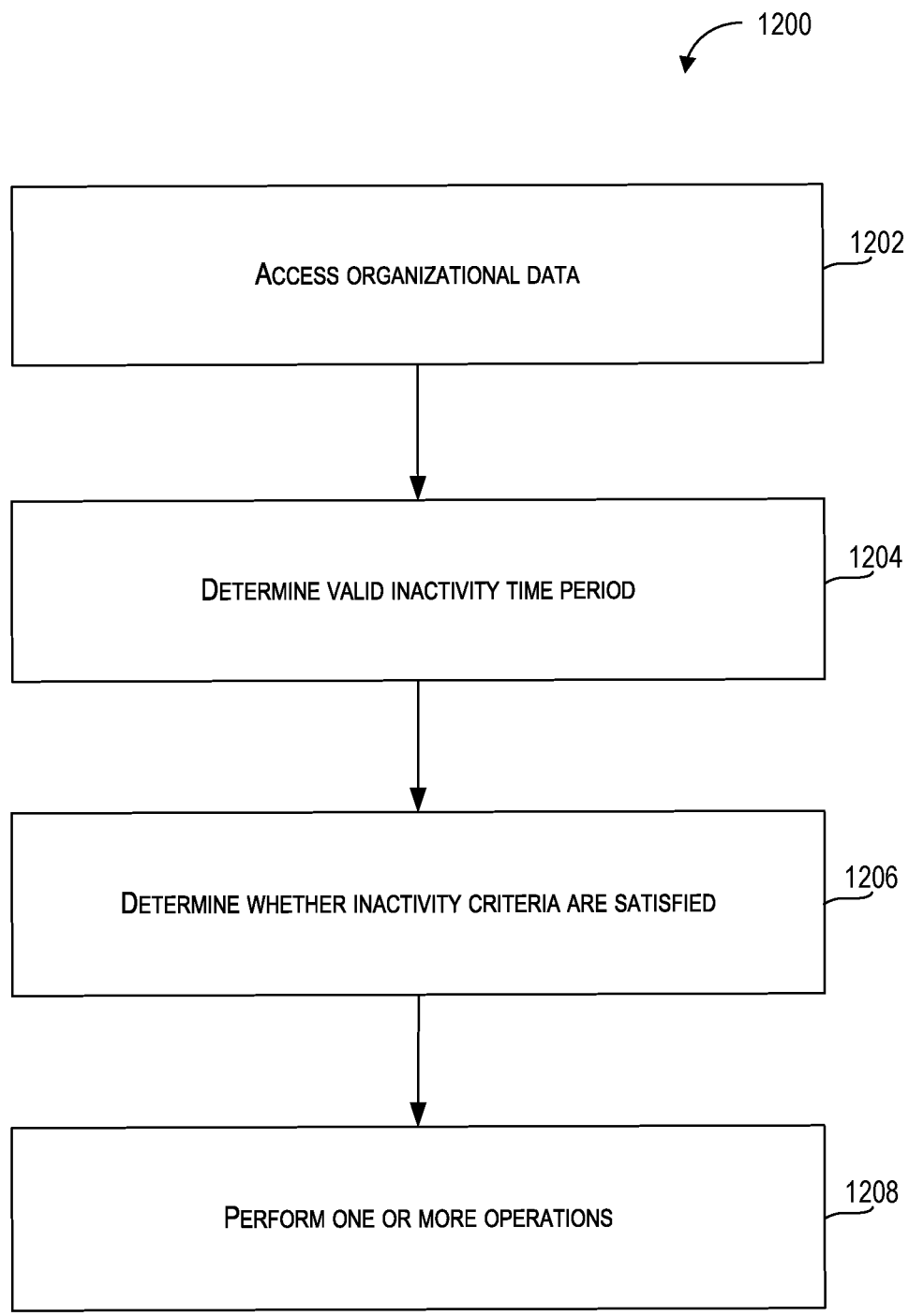
FIG. 12 depicts a flow diagram of checking the activity of computing devices according to example embodiments of the present disclosure.

FIG. 12 depicts a flow diagram of checking the activity of computing devices according to example embodiments of the present disclosure. One or more portions of the method 1200 can be executed and/or implemented on one or more computing devices or computing systems including, for example, the computing system 110, the remote computing system 130, the one or more computing devices 152, and/or the computing device 200. Further, one or more portions of the method 1200 can be executed or implemented as an algorithm on the hardware devices or systems disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include accessing, based at least in part on a device policy, organizational data that can include information associated with activity of a computing device of a user. The device policy can include inactivity criteria associated with inactivity of the computing device. For example, the computing system 110 can access device policy data that includes a device policy. The device policy can include inactivity criteria associated with the times (e.g., dates and/or times of day) associated with whether a computing device 152 has been active or inactive (e.g., not accessing other computing systems). The device policy can be used to reference organizational data including information associated with the activity and/or inactivity of the computing device of the one or more computing devices 152.

At 1204, the method 1200 can include determining, based at least in part on the device policy and the organizational data, a valid inactivity time period that includes one or more organization approved time periods of valid inactivity that are continuous and comprise a time period beginning at a most recent time the computing device was active and ending a predetermined amount of time after the most recent time the computing device was active. For example, the computing system 110 can use the device policy to analyze the organizational data and determine the most recent time that a computing device of the one or more computing devices 152 was active (e.g., checked-in to the computing system 110). Based on the most recent time the computing device of the one or more computing devices 152 was active, the computing system 110 can access the device policy and add a predetermined amount of time stored in the device policy to the most recent time the computing device was active in order to determine a first organization approved time period of valid inactivity.

The computing system 110 can also determine whether the organizational data includes information associated with one or more other organization approved time periods (e.g., the user being on vacation) that are continuous with the first organization approved time period and end after the first organization approved time period. If the organizational data does not include one or more other organization approved time periods then the valid inactivity time period corresponds to the first organization approved time period. If the organizational data includes one or more other organization approved time periods that are continuous with the first organization approved time period and end after the first organization approved time period, then the valid inactivity time period will end at the end of the one or more other organization approved time periods.

At 1206, the method 1200 can include determining, based at least in part on the device policy and the organizational data, whether the inactivity criteria are satisfied. Satisfying the inactivity criteria can include the computing device being inactive after the valid inactivity time period. For example, after the computing system 110 can access the device policy to determine the inactivity criteria. The computing system 110 can then use the inactivity criteria to determine whether the computing device of the one or more computing devices 152 was inactive after the end of the valid inactivity time period.

At 1208, the method 1200 can include performing, based at least in part on the device policy, one or more operations if the inactivity criteria are satisfied. The one or more operations can include generating one or more indications associated with the computing device being inactive. For example, the computing system 110 can perform one or more operations that include sending a text message to a manager of the user of the computing device. The text message can notify the manager that the computing device was inactive for longer than the valid inactivity time period.

Figure 13:
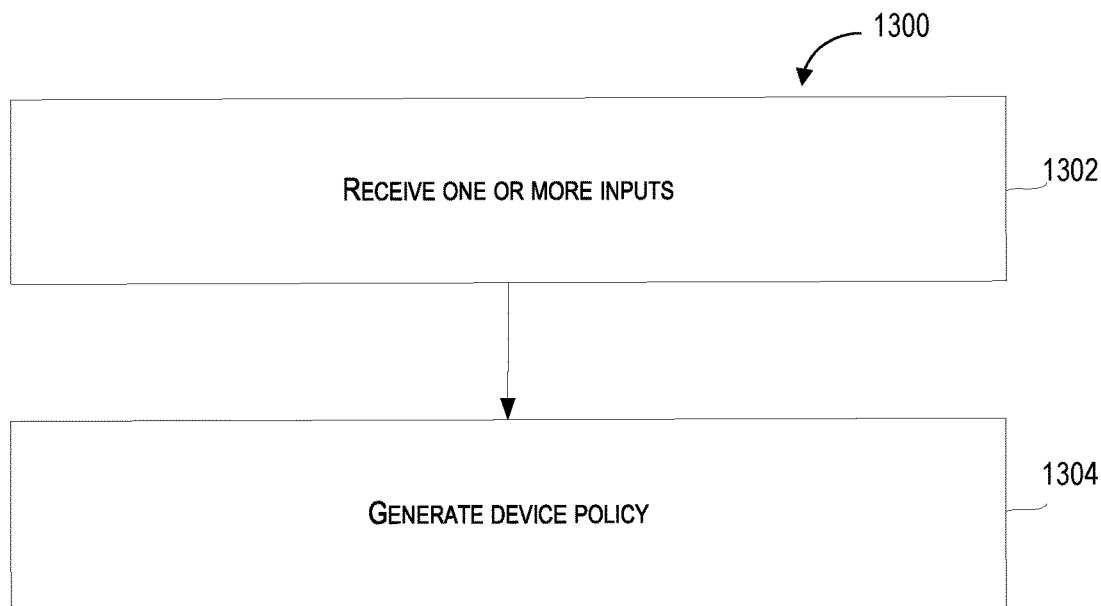
FIG. 13 depicts a flow diagram of checking the activity of computing devices according to example embodiments of the present disclosure.

FIG. 13 depicts a flow diagram of checking the activity of computing devices according to example embodiments of the present disclosure. One or more portions of the method 1300 can be executed and/or implemented on one or more computing devices and/or computing systems including, for example, the computing system 110, the remote computing system 130, the one or more computing devices 152, and/or the computing device 200. Further, one or more portions of the method 1300 can be executed or implemented as an algorithm on the hardware devices or systems disclosed herein. FIG. 13 depicts steps performed in a particular order for purposes of illustration and discussion. In some embodiments, one or more portions of the method 1300 can be performed as part of the method 1200 that is depicted in FIG. 12. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include receiving one or more inputs via a graphical user interface configured to one or more options to configure a device policy for one or more computing devices including the computing device of the user. The one or more options can be associated with or include a user identifier, a device identifier, and/or the predetermined amount of time. For example, a graphical user interface generated by the computing system 110 can be configured to receive and/or detect one or more inputs including one or more touch inputs from a user. The one or more options of the graphical user interface can be respectively associated with one or more interface elements and/or one or fields that can be used to generate and/or configure the device policy. Further, the one or more options can include an option to select and/or enter the user identifier (e.g., the name of the user), an option to select and/or enter the device identifier (e.g., a unique identifier associated with the computing device), and/or an option to enter the predetermined amount of time (e.g., a predetermined amount of time in months, weeks, days, hours, and/or minutes).

At 1304, the method 1300 can include generating the device policy based at least in part on the one or more inputs. For example, the computing system 110 can use the one or more inputs to generate a device policy that is applicable to a particular user associated with the input user identifier, a particular computing device associated with the device identifier, and with a valid inactivity time period that is based at least in part on the predetermined amount of time).

Figure 14:
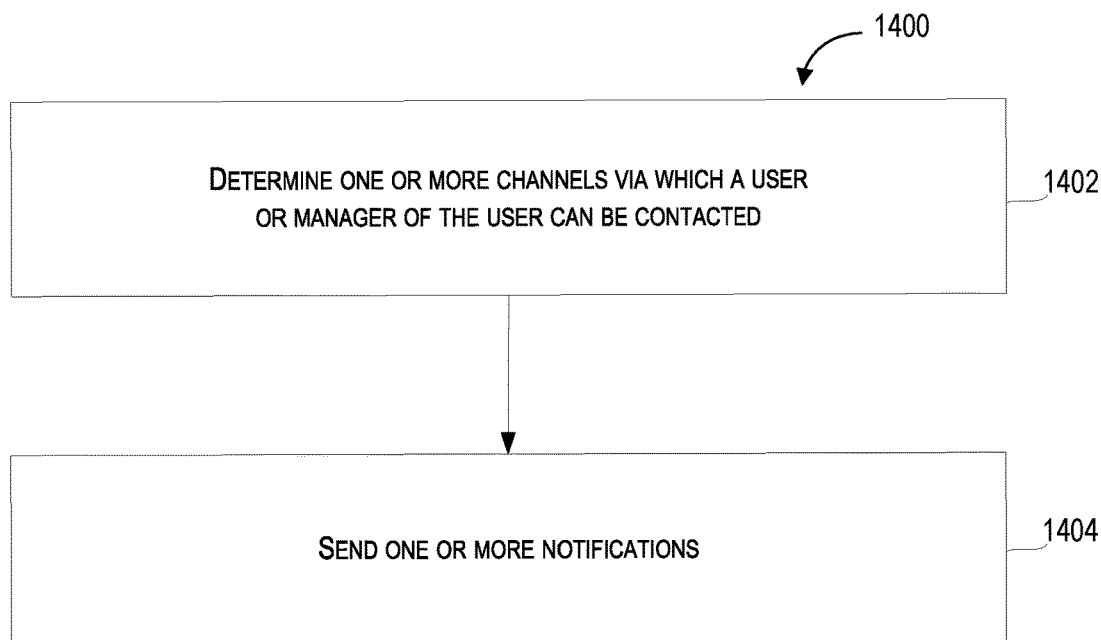
FIG. 14 depicts a flow diagram of checking the activity of computing devices according to example embodiments of the present disclosure.

FIG. 14 depicts a flow diagram of checking the activity of computing devices according to example embodiments of the present disclosure. One or more portions of the method 1400 can be executed and/or implemented on one or more computing devices and/or computing systems including, for example, the computing system 110, the remote computing system 130, the one or more computing devices 152, and/or the computing device 200. Further, one or more portions of the method 1400 can be executed or implemented as an algorithm on the hardware devices or systems disclosed herein. FIG. 14 depicts steps performed in a particular order for purposes of illustration and discussion. In some embodiments, one or more portions of the method 1400 can be performed as part of the method 1200 that is depicted in FIG. 12. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include determining, based at least in part on the organizational data, one or more communications channels via which the user or a manager of the user can be contacted. For example, the computing system 110 can access the organizational data and search the organizational data for the one or more communications channels that are used by the user of the computing device (e.g., the user's e-mail address, instant messaging application identifier, and/or telephone number). Further, the computing system 110 can access the organizational data and determine one or more relationships between the user and one or more members of the organization of which the user is a member. Based at least in part on the one or more relationships, the computing system 110 can determine any other users that are associated with the user including any users that are higher in the organization's hierarchy than the user (e.g., a manager or supervisor of the user).

At 1404, the method 1400 can include sending one or more notifications including the one or more indications to the user or the manager via the one or more communications channels. For example, the computing system 110 can send one or more notifications to an e-mail address of the user. The one or more notifications can include one or more indications that the user's computing device has been inactive after the end of the valid inactivity time period.

Figure 15:
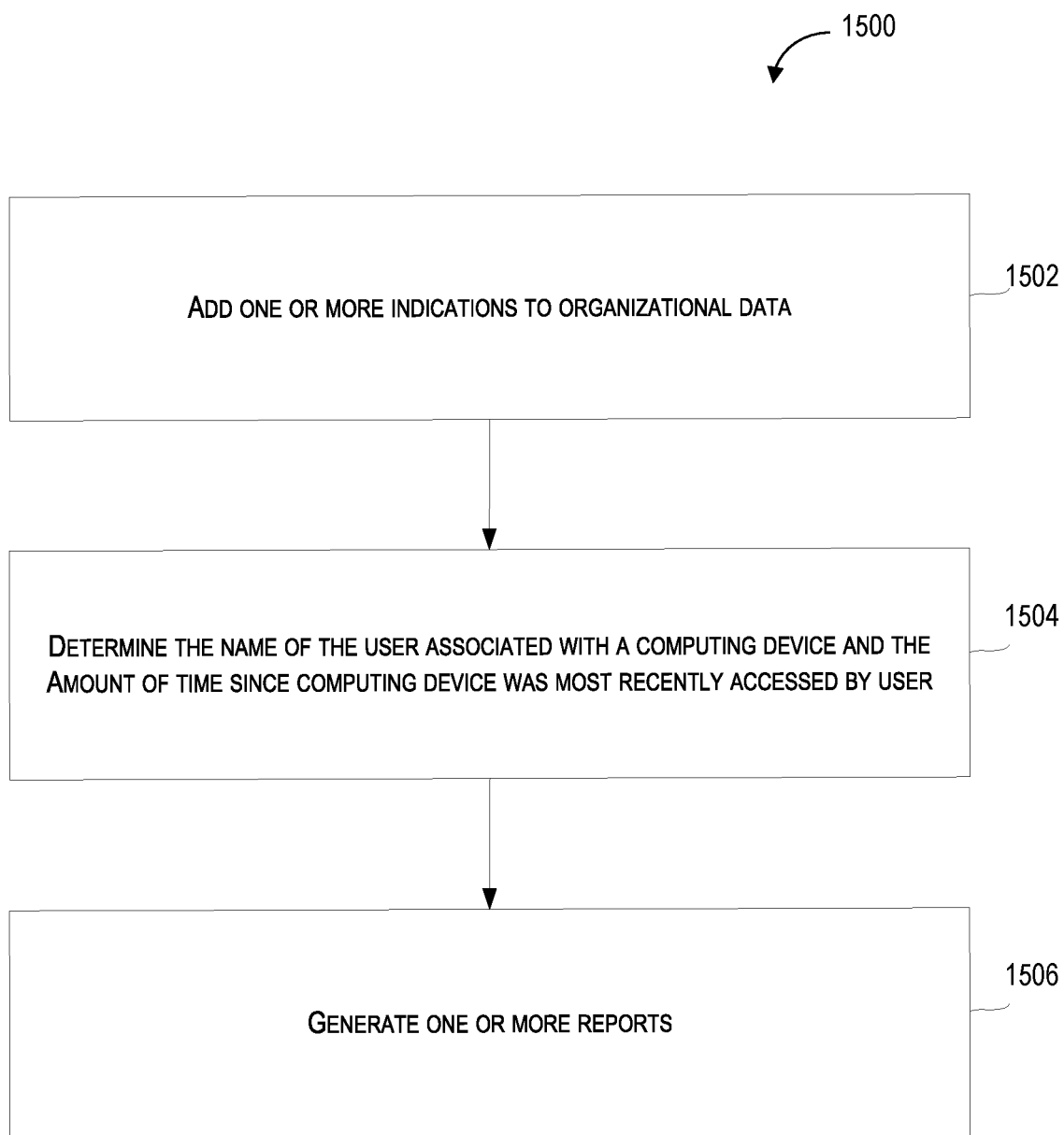
FIG. 15 depicts a flow diagram of checking the activity of computing devices according to example embodiments of the present disclosure.

FIG. 15 depicts a flow diagram of checking the activity of computing devices according to example embodiments of the present disclosure. One or more portions of the method 1500 can be executed and/or implemented on one or more computing devices and/or computing systems including, for example, the computing system 110, the remote computing system 130, the one or more computing devices 152, and/or the computing device 200. Further, one or more portions of the method 1500 can be executed or implemented as an algorithm on the hardware devices or systems disclosed herein. FIG. 15 depicts steps performed in a particular order for purposes of illustration and discussion. In some embodiments, one or more portions of the method 1500 can be performed as part of the method 1200 that is depicted in FIG. 12. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include adding the one or more indications associated with the computing device being inactive to the organizational data. The one or more indications can include a current time, a device identifier associated with the computing device, and/or a user identifier associated with the user. For example, the computing system 110 can access the organizational data and modify the organizational data by writing information associated with the current time, the device identifier, and the user identifier.

At 1504, the method 1500 can include determining, based at least in part on the organizational data, a name of the user associated with the computing device and an amount of time since the computing device was accessed by the user. For example, the computing system 110 can access the organizational data and determine the name of the user associated with a computing device of the one or more computing devices 152. The computing system 110 can then determine the current time (e.g., access an internal clock of the computing system 110 and/or access a remote computing device that provides a current time). Further, the computing system 110 can use the organizational data to determine the most recent time that the computing device of the one or more computing devices 152 was accessed by the user (e.g., the user logging in to the computing device of the one or more computing devices 152) and determine the amount of time since the computing device was accessed by the user based at least in part on the time difference between the current time and the most recent time the computing device of the one or more computing devices 152 was accessed by the user.

At 1506, the method 1500 can include generating one or more reports including the name of the user associated with the computing device and/or an amount of time since the computing device was most recently accessed by the user. For example, the computing system 110 can generate one or more reports that include the name of the user associated with the computing device and an amount of time (in hours) since the user most recently logged into the computing device or checked-in to a remote computing device of the organization of which the user is a member.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system tor automated information technology management responsive to changes in linked employee data, the computing system comprising:
   one or more processors;
   one or more databases that store a centralized set of organizational data associated with an organization, wherein the centralized set of organizational data comprises a plurality of device objects respectively associated with a plurality of computing devices and a plurality of employee objects respectively associated with a plurality of employees of the organization, wherein a first device object of the plurality of device objects is associated in the one or more databases with a first employee object of the plurality of employee objects, wherein the first device object is associated with a first computing device of the plurality of computing devices, and wherein the first employee object is associated with a first employee of the plurality of employees of the organization; and one or more non-transitory computer-readable media that collectively store instructions that, when executed by the one or more processors, cause the computing system to perform actions, the actions comprising:

receiving data descriptive of a change to the first employee object; and responsive to receipt of the data descriptive of the change to the first employee object:

identifying the first device object associated with the first employee object in the one or more databases;

accessing a device policy for the first device object;

evaluating the device policy based at least in part on the change to the first employee object; and performing one or more operations determined from evaluating the device policy based at least in part on the change to the first employee object;

wherein: the device policy comprises a user-defined query expression expressed in a domain-specific query language; and evaluating the device policy based at least in part on the change to the first employee object comprises running the query against the centralized set of organizational data to return one or more query results.

2. The computing system of claim 1, wherein:

the device policy comprises a configuration policy for automatically configuring the first computing device; and performing the one or more operations comprises automatically configuring the first computing device to an updated configuration, wherein the updated configuration is based on the change to the first employee object.

3. The computing system of claim 2, wherein:

the first computing device is separate and physically remote from computing system; and automatically configuring the first computing device to the updated configuration comprises automatically installing one or more software applications onto the first computing device.

4. The computing system of claim 2, wherein:

the first computing device is separate and physically remote from computing system; and automatically configuring the first computing device to the updated configuration comprises automatically uninstalling one or more software applications from the first computing device.

5. The computing system of claim 1, wherein: performing the one or more operations determined from evaluating the device policy comprises modifying one or more access controls associated with the first computing device; and the one or more access controls comprise account settings or password settings.

6. The computing system of claim 1, wherein:

the change to the first employee object comprises a change to an employment status included in the first employee object, the employment status indicating whether or not the first employee is actively employed by the organization; and performing the one or more operations determined from evaluating the device policy comprises activating or deactivating the first computing device based on the change to the employment status included in the first employee object.

7. The computing system of claim 1, wherein evaluating the device policy at least in part on the change to the first employee object comprises evaluating organizational data descriptive of relationships between multiple different employees within an organizational hierarchy of the organization.

8. The computing system of claim 1, wherein the change to the first employee object is automatically performed by the computing system based on data ingested from a third party application.

9. The computing system of claim 1, wherein:

the organizational data comprises a graph;

the first employee object and the first device object comprise nodes in the graph; and the association between the first employee object and the first device object comprises an edge between the nodes in the graph.

10. The computing system of claim 1, wherein:

the change to the first employee object comprises a change to a work location included in the first employee object; and performing one or more operations determined from evaluating the device policy comprises modifying one or more software licenses associated with the first device object.

11. The computing system of claim 1, wherein the device policy comprises a user-defined policy defined by an information technology administrator.

12. A computer-implemented method for improved computing device operations based on organizational relationship data, the method comprising:

maintaining, by a computing system comprising one or more processors, one or more databases that store a centralized set of organizational data associated with an organization, wherein the centralized set of organizational data comprises a plurality of device objects respectively associated with a plurality of computing devices and a plurality of employee objects respectively associated with a plurality of employees of the organization, wherein a first device object of the plurality of device objects is associated in the one or more databases with a first employee object of the plurality of employee objects, wherein the first device object is associated with a first computing device of the plurality of computing devices, and wherein the first employee object is associated with a first employee of the plurality of employees of the organization;

receiving, by the computing system, device data associated with the first computing device;

determining, by the computing system and as a result of evaluating a device policy associated with the first computing device based on the device data, that one or more operations have been triggered;

identifying, by the computing system and based on organizational structure data that defines organizational relationships between the plurality of employee objects, a second employee object that is a specified subject of the one or more operations triggered by the device policy associated with the first computing device, the second employee object being different from the first employee object;

identifying, by the computing system, a second employee that is associated with the second employee object; and causing, by the computing system, the one or more operations to be performed relative to the second employee;

wherein: the device policy comprises a user-defined query expression expressed in a domain-specific query language; and evaluating the device policy associated with the first computing device based on the device data comprises running the query against the centralized set of organizational data to return one or more query results.

13. The computer-implemented method of claim 12, wherein:
the one or more operations comprise a transmission of a notification;
the second employee object is a specified recipient of the notification; and
causing the one or more operations to be performed relative to the second employee comprises causing the notification to be transmitted to the second employee.

14. The computer-implemented method of claim 13, wherein:
the device policy indicates that the notification should be sent to a manager of the first employee; and
the organizational structure data indicates that the second employee is the manager of the first employee.

15. The computer-implemented method of claim 13, wherein:
the device policy comprises a set of rules regarding permitted software installations on the first computing device.

16. The computer-implemented method of claim 13, wherein:
the device policy comprises a set of rules regarding storage amounts at the first computing device.

17. One or more non-transitory computer-readable media that collectively store:
one or more databases that store a centralized set of organizational data associated with an organization, wherein the centralized set of organizational data comprises a plurality of device objects respectively associated with a plurality of computing devices and a plurality of employee objects respectively associated with a plurality of employees of the organization, wherein a first device object of the plurality of device objects is associated with a first employee object of the plurality of employee objects; and
instructions that, when executed by one or more processors, cause a computing system to perform actions, the actions comprising:
receiving device data associated with a first computing device associated with the first device object;
obtaining a device policy associated with the first computing device;
accessing, from the centralized set of organizational data, an employee record associated with the first employee object with which the first device object is associated in the centralized set of organizational data;
evaluating the device policy based at least in part on the employee record to determine one or more operations; and
performing the one or more operations determined from evaluating the device policy;
wherein: the device policy comprises a user-defined query expression expressed in a domain-specific query language; and evaluating the device policy based at least in part on the employee record comprises running the query against the centralized set of organizational data to return one or more query results.

18. The one or more non-transitory computer-readable media of claim 17, wherein:
evaluating the device policy based at least in part on the employee record comprises determining, based at least in part on the employee record, whether the first employee is currently on paid time off.

19. The one or more non-transitory computer-readable media of claim 18, wherein performing the one or more operations determined from evaluating the device policy comprise suspending generation of an inactivity alert until the first employee is no longer on paid time off.

* * * * *